(12) United States Patent
Endo et al.

(10) Patent No.: US 9,363,430 B2
(45) Date of Patent: Jun. 7, 2016

(54) IMAGING DEVICE AND IMAGE PROCESSING METHOD

(71) Applicant: FUJIFILM Corporation, Tokyo (JP)

(72) Inventors: Hiroshi Endo, Saitama (JP); Kenkichi Hayashi, Saitama (JP); Kousuke Irie, Saitama (JP); Yousuke Naruse, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/661,361

(22) Filed: Mar. 18, 2015

(65) Prior Publication Data

US 2015/0195447 A1    Jul. 9, 2015

Related U.S. Application Data

(63) Continuation of application No. PCT/JP2013/061842, filed on Apr. 23, 2013.

(30) Foreign Application Priority Data

Sep. 27, 2012   (JP) ................................ 2012-213831

(51) Int. Cl.
*H04N 5/232*      (2006.01)
*H04N 5/217*      (2011.01)
*G02B 13/00*      (2006.01)
*G06T 5/00*       (2006.01)

(52) U.S. Cl.
CPC ........ *H04N 5/23212* (2013.01); *G02B 13/0015* (2013.01); *G06T 5/001* (2013.01); *G06T 5/003* (2013.01); *H04N 5/217* (2013.01); *H04N 5/23209* (2013.01)

(58) Field of Classification Search
None
See application file for complete search history.

(56) References Cited

U.S. PATENT DOCUMENTS

| | | | | |
|---|---|---|---|---|
| 8,218,823 | B2* | 7/2012 | Wang ................ | G06K 9/00201 356/4.03 |
| 8,290,264 | B2* | 10/2012 | Kim .................. | G06K 9/38 382/173 |
| 8,724,919 | B2* | 5/2014 | Pillman ............. | G06T 5/003 382/173 |
| 8,866,884 | B2* | 10/2014 | Ito .................... | H04N 13/026 345/419 |
| 8,928,772 | B2* | 1/2015 | Pillman ............. | G06T 5/004 348/222.1 |

(Continued)

FOREIGN PATENT DOCUMENTS

| | | |
|---|---|---|
| JP | 2011-259314 A | 7/2001 |
| JP | 2011-211663 A | 10/2011 |
| JP | 2011-259314 A | 12/2011 |

OTHER PUBLICATIONS

International Search Report issued in PCT/JP2013/061842, mailed on May 28, 2013.

(Continued)

*Primary Examiner* — Michael Osinski
(74) *Attorney, Agent, or Firm* — Birch, Stewart, Kolasch & Birch, LLP

(57) ABSTRACT

According to the present invention, when restoration processing of a taken image by the use of a restoration filter corresponding to a subject distance is performed, by storing only a corresponding restoration filter in a subject distance range between the estimation variation close range and the infinity such that a restoration filter in a range on the nearer side than the estimation variation close range is not provided from the beginning, it is thereby possible to reduce the number of restoration filters held beforehand.

9 Claims, 15 Drawing Sheets

(56) References Cited

U.S. PATENT DOCUMENTS

| | | | |
|---|---|---|---|
| 8,928,783 B2 * | 1/2015 | Yoshida | H04N 5/23219 348/222.1 |
| 2001/0008418 A1 | 7/2001 | Yamanaka et al. | |
| 2003/0002746 A1 * | 1/2003 | Kusaka | H04N 5/217 382/255 |
| 2003/0007076 A1 * | 1/2003 | Okisu | H04N 5/23245 348/222.1 |
| 2007/0024931 A1 * | 2/2007 | Compton | H04N 9/045 358/512 |
| 2010/0053344 A1 * | 3/2010 | Tsukamoto | G03B 5/00 348/208.4 |
| 2011/0199511 A1 * | 8/2011 | Takahashi | H04N 1/00198 348/231.5 |
| 2012/0134596 A1 * | 5/2012 | Yamada | G06K 9/3275 382/199 |
| 2013/0050543 A1 * | 2/2013 | Higashitsutsumi | G06T 5/003 348/241 |
| 2014/0043437 A1 * | 2/2014 | Ueda | H04N 13/0296 348/46 |
| 2014/0093159 A1 * | 4/2014 | Nguyen | G06T 5/002 382/154 |
| 2015/0195448 A1 * | 7/2015 | Endo | H04N 5/23229 348/349 |
| 2015/0381965 A1 * | 12/2015 | Atanassov | G06T 7/0051 348/47 |

OTHER PUBLICATIONS

Written Opinion issued in PCT/JP2013/061842, mailed on May 28, 2013.

* cited by examiner

IMAGING DEVICE AND IMAGE PROCESSING METHOD

CROSS-REFERENCE TO RELATED APPLICATIONS

This application is a Continuation of PCT International Application No. PCT/JP2013/061842 filed on Apr. 23, 2013, which claims priority under 35 U.S.C. §119(a) to Japanese Patent Application No. 2012-213831 filed on Sep. 27, 2012. Each of the above application(s) is hereby expressly incorporated by reference, in its entirety, into the present application.

BACKGROUND OF THE INVENTION

1. Field of the Invention

The present invention relates to an imaging device and an image processing method, and specifically relates to an imaging device and an image processing method that perform point restoration processing of an image taken on the basis of PSF (Point Spread Function).

2. Description of the Related Art

Point restoration processing of a taken image is processing of finding the characteristic of degradation (PSF) due to the aberration or the like of a photographing lens beforehand and restoring the taken image (degraded image) to an original image of high resolution by performing filter processing by the use of a restoration filter created on the basis of the PSF.

PTL 1 (Japanese Patent Laid-Open No. 2011-211663) discloses an image processing apparatus that acquires an imaging state including a subject distance, acquires a restoration filter corresponding to the imaging state of each restoration region of a degraded image and restores the degraded image of each restoration region by the use of the degraded image and the restoration filter. The PSF varies according to the lens type, zoom magnification, f-number, subject distance and the angle of view (image height), and so on, and therefore it is necessary to prepare a lot of restoration filters.

The image processing apparatus described in PTL 1 includes a memory that holds multiple restoration filter lists corresponding to a combination of the lens type, zoom magnification and f-number. Each restoration filter list includes multiple restoration filter tables classified by the subject distance, and the restoration filter table holds a restoration filter (determinant of filter coefficients forming the restoration filter) for each image height (restoration region) (FIG. 3 of PTL 1).

SUMMARY OF THE INVENTION

To properly perform point restoration processing with respect to a degraded image, it is necessary to select an optimal restoration filter corresponding to the lens type, zoom magnification, f-number, subject distance and the angle of view (image height), and so on, and perform restoration processing of the degraded image by the use of the selected restoration filter, but, in this case, it is necessary to store and hold many restoration filters in a memory and there is a problem that the memory capacity increases.

PTL 1 contains a description that multiple restoration filters are discretely held, a restoration filter corresponding to the intermediate value is generated by interpolation and thereby the capacity of a memory that holds the restoration filters is decreased.

However, there are problems that it is not possible to generate an appropriate restoration filter by interpolation when the interval between discretely held restoration filters (for example, the interval between subject distances) is widened in a case where the number of restoration filters is decreased by discretely holding the restoration filters, or the resolution is unintentionally degraded in a case where overcorrection is caused by the generated restoration filter. Here, as a condition that the overcorrection is caused, a case is possible where the subject distance is measured in an incorrect manner and, as a result, a restoration filter corresponding to the incorrect subject distance is used.

The present invention is made in view of such circumstances, and it is an object to provide an imaging device and image processing method that can: decrease the number of restoration filters held beforehand when restoration processing of a taken image is performed using a restoration filter corresponding to the subject distance; and achieve the improvement of resolution by the restoration processing.

To achieve the above-mentioned object, an imaging device according to one mode of the present invention includes: an imaging unit configured to take a subject image formed by an imaging lens and acquire an image showing the subject image; a first subject distance estimation unit configured to calculate an estimated subject distance by a focus detection unit at imaging by the imaging unit; a restoration filter storage unit configured to store one or more restoration filters selected from multiple restoration filters created based on at least a point spread function of the imaging lens corresponding to a subject distance; a restoration filter selection unit configured to select a restoration filter corresponding to the subject distance from the restoration filters stored in the restoration filter storage unit, based on the subject distance estimated by the first subject distance estimation unit; and a restoration processing unit configured to perform restoration processing of the image acquired by the imaging unit using the restoration filter selected by the restoration filter selection unit, where the restoration filter storage unit stores a corresponding restoration filter within a subject distance range between an infinity and a subject distance adding only a maximum infinity-side estimation variation in a range of estimation variation with respect to a nearest-side subject distance to the nearest-side subject distance estimated by the first subject distance estimation unit.

According to one mode of the present invention, multiple restoration filters created based on at least a point spread function of an imaging lens corresponding to a subject distance are stored in the restoration filter storage unit, but multiple restoration filters created over the whole range of a subject distance in which imaging is possible are not stored and one or more restoration filters selected from multiple restoration filters are stored. That is, the restoration filter storage unit stores a corresponding restoration filter within a subject distance range between the infinity and a subject distance (hereinafter referred to as "estimation variation close range") adding only the maximum infinity-side estimation variation in a range of estimation variation with respect to the subject distance estimated by the first subject distance estimation unit with respect to a nearest-side subject distance to the nearest-side subject distance estimated by the first subject distance estimation unit.

A point spread function (PSF) varies according to the subject distance, and a PSF on the close end side has a wider shape than a PSF on the infinity side. As a result, the restoration filer on the close end side is prepared in advance as the one to perform stronger restoration processing, as compared with the restoration filter on the infinity side.

There is a possibility that restoration filters within the range on the nearer side than the estimation variation close range perform restoration processing of overcorrection.

Therefore, by storing only a corresponding restoration filter in a subject distance range between the estimation variation close range and the infinity such that restoration filters in a range on the nearer side than the estimation variation close range are not provided from the beginning, the number of restoration filters stored in the restoration filter storage unit is thereby reduced.

In an imaging device according to another mode of the present invention, it is preferable that the first subject distance estimation unit estimates the subject distance based on a lens position of a focus lens of the imaging lens.

In an imaging device according to another mode of the present invention, the imaging lens is an interchangeable lens, and the maximum infinity-side estimation variation in the range of estimation variation with respect to the subject distance estimated by the first subject distance estimation unit is at least one of estimation variation by an individual difference of the interchangeable lens and estimation variation by a temperature characteristic of the interchangeable lens.

In an imaging device according to another mode of the present invention, it is preferable that it includes: an estimation variation acquisition unit configured to acquire a maximum infinity-side estimation variation in a range of estimation variation with respect to the subject distance estimated by the first subject distance estimation unit; and a second subject distance estimation unit configured to calculate a subject distance adding the maximum infinity-side estimation variation acquired by the estimation variation acquisition unit to the subject distance estimated by the first subject distance estimation unit, where the restoration filter selection unit selects an infinity-side restoration filter closest to the subject distance calculated by the second subject distance estimation unit among the one or more restoration filters stored in the restoration filter storage unit.

The subject distance is estimated by the first subject distance estimation unit, and the maximum infinity-side estimation variation in the range of variation (estimation variation) with respect to this estimated subject distance is acquired by the estimation variation acquisition unit. A subject distance adding the subject distance estimated by the first subject distance estimation unit and the maximum infinity-side estimation variation acquired by the estimation variation acquisition unit is calculated. This calculated subject distance is a subject distance when the estimated subject distance varies most on the infinity side. Then, when a restoration filter used for restoration processing is selected from one or more restoration filters corresponding to the subject distance which are stored in the restoration filter storage unit, a restoration filter corresponding to the infinity side nearest the calculated subject distance is selected. By selecting a restoration filter corresponding to the infinity side closest to the subject distance when the estimated subject distance varies on the infinity side most, it is possible to select a restoration filter corresponding to the subject distance when it varies on the infinity side most, or a restoration filter to perform weaker restoration processing than it. By this means, it is possible to prevent restoration processing of overcorrection by the selected restoration filter (prevent resolution degradation) and achieve the improvement of resolution by the restoration filter.

In an imaging device according to another mode of the present invention, it is preferable that the imaging lens is an interchangeable lens in which the restoration filter storage unit is incorporated. By this means, it is possible to acquire a restoration filter corresponding to the lens from the restoration filter storage unit on the lens side without providing the restoration filter storage unit on the side of the imaging device body.

In an imaging device according to another mode of the present invention, it is preferable that: the imaging lens is an interchangeable lens; and the estimation variation acquisition unit acquires at least one of estimation variation by an individual difference of an interchangeable lens and estimation variation by a temperature characteristic of the interchangeable lens from the interchangeable lens.

In an imaging system according to another mode of the present invention, it is preferable that: the imaging lens is an interchangeable lens; and the estimation variation acquisition unit includes a lens information acquisition unit configured to acquire lens information on an interchangeable lens from the interchangeable lens to be attached and an estimation variation storage unit configured to store estimation variation of each of multiple interchangeable lenses, and acquires estimation variation corresponding to the lens information acquired by the lens information acquisition unit from the estimation variation storage unit.

In an imaging device according to another mode of the present invention, it is preferable that a recording unit configured to record an image acquired by performing restoration processing by the restoration processing unit is included.

In an imaging device according to another mode of the present invention, it includes: an image acquisition step of acquiring an image showing a subject image from an imaging unit having an imaging lens; a first subject distance estimation step of calculating an estimated subject distance by a focus detection unit at imaging by the imaging unit; a step of preparing a restoration filter storage unit configured to store one or more restoration filters selected from multiple restoration filters created based on at least a point spread function of the imaging lens corresponding to a subject distance; a restoration filter selection step of selecting a restoration filter corresponding to the subject distance from the restoration filters stored in the restoration filter storage unit, based on the subject distance estimated in the first subject distance estimation step; and a restoration processing step of performing restoration processing of the image acquired by the imaging unit using the restoration filter selected in the restoration filter selection step, where the restoration filter storage unit stores a corresponding restoration filter within a subject distance range between an infinity and a subject distance adding only a maximum infinity-side estimation variation in a range of estimation variation with respect to the subject distance estimated in the first subject distance estimation step with respect to a nearest-side subject distance to the nearest-side subject distance estimated in the first subject distance estimation step.

According to the present invention, when restoration processing of a taken image by the use of a restoration filter corresponding to a subject distance is performed, by storing only a corresponding restoration filter in a subject distance range between the estimation variation close range and the infinity such that restoration filters in a range on the nearer side than the estimation variation close range are not provided from the beginning, it is thereby possible to reduce the number of restoration filters held beforehand. Here, since there is a possibility that the restoration filters in the range on the nearer side than the estimation variation close range perform restoration processing of overcorrection, it is preferable that these restoration filters are not used.

DETAILED DESCRIPTION OF THE EMBODIMENTS

Figure 1:
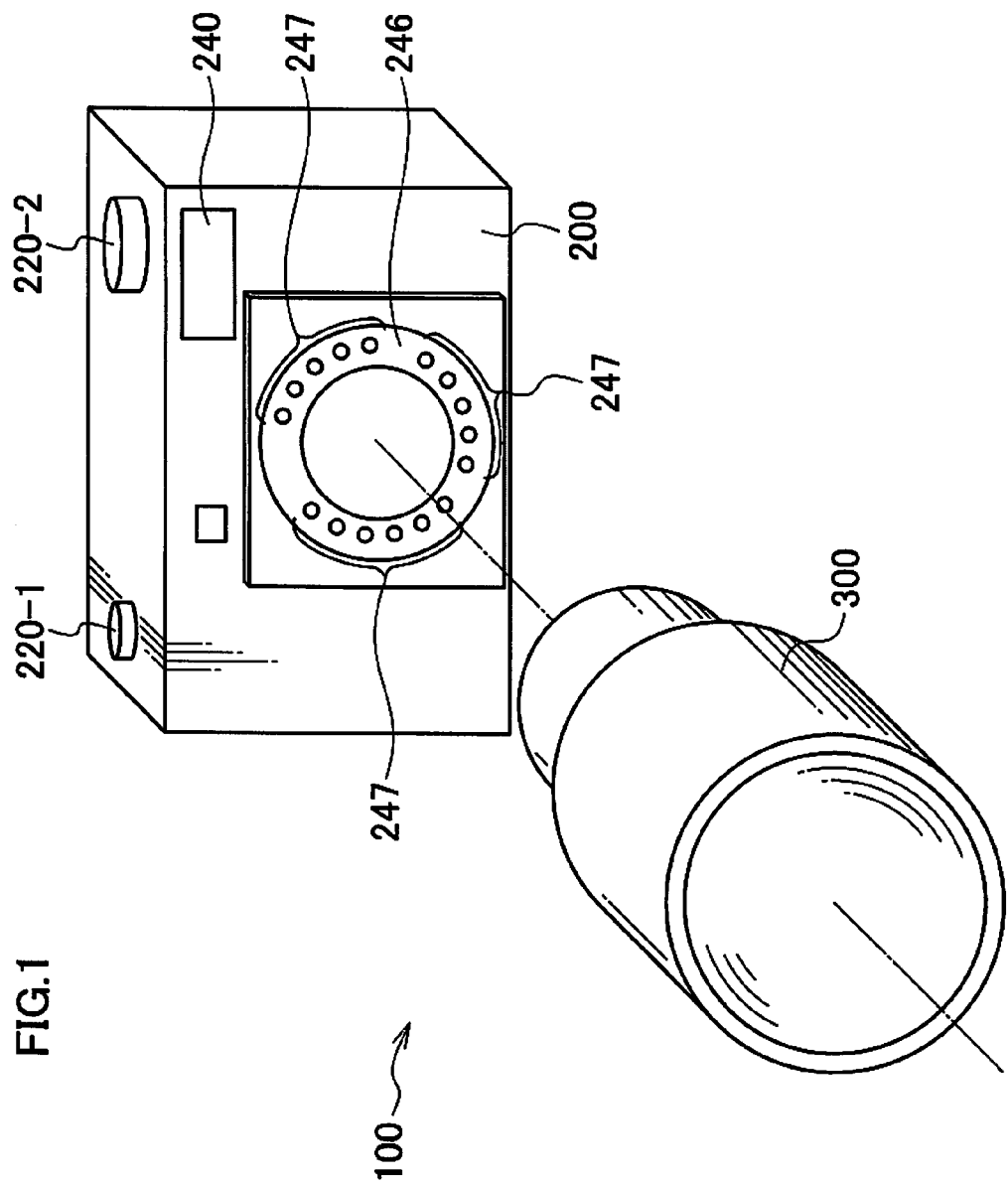
FIG. 1 is an outline drawing of an imaging device according to one mode of the present invention.

FIG. 1 is a perspective view illustrating the appearance of an imaging device 100 according to one mode of the present invention. The imaging device 100 includes an imaging device body 200 and a lens apparatus 300 attached to the imaging device body 200 in an exchangeable manner. The imaging device body 200 and the lens apparatus 300 are attached in an exchangeable manner by combining a mount 246 (transmission means and reception means) included in the imaging device body 200 and a mount 346 (reception means and transmission means) (see FIG. 3) on the side of the lens apparatus 300 corresponding to the mount 246. Moreover, besides the mount 246, a flash 240 is installed in the front surface of the imaging device body 200, and a release button 220-1 and a dial 220-2 for the setting of an imaging mode are installed in the upper surface.

A terminal 247 (transmission means and reception means) is installed in the mount 246, a terminal 347 (transmission means and reception means) (see FIG. 3) is installed in the mount 346, and, when the lens apparatus 300 is attached to the imaging device body 200, the corresponding terminal 247 and terminal 347 are contacted and communication becomes possible. Here, the terminal 247 and the terminal 347 in FIGS. 1 and 3 are conceptually illustrated, and the positions and number of terminals in the present invention are not limited to the ones in these figures.

Figure 2:
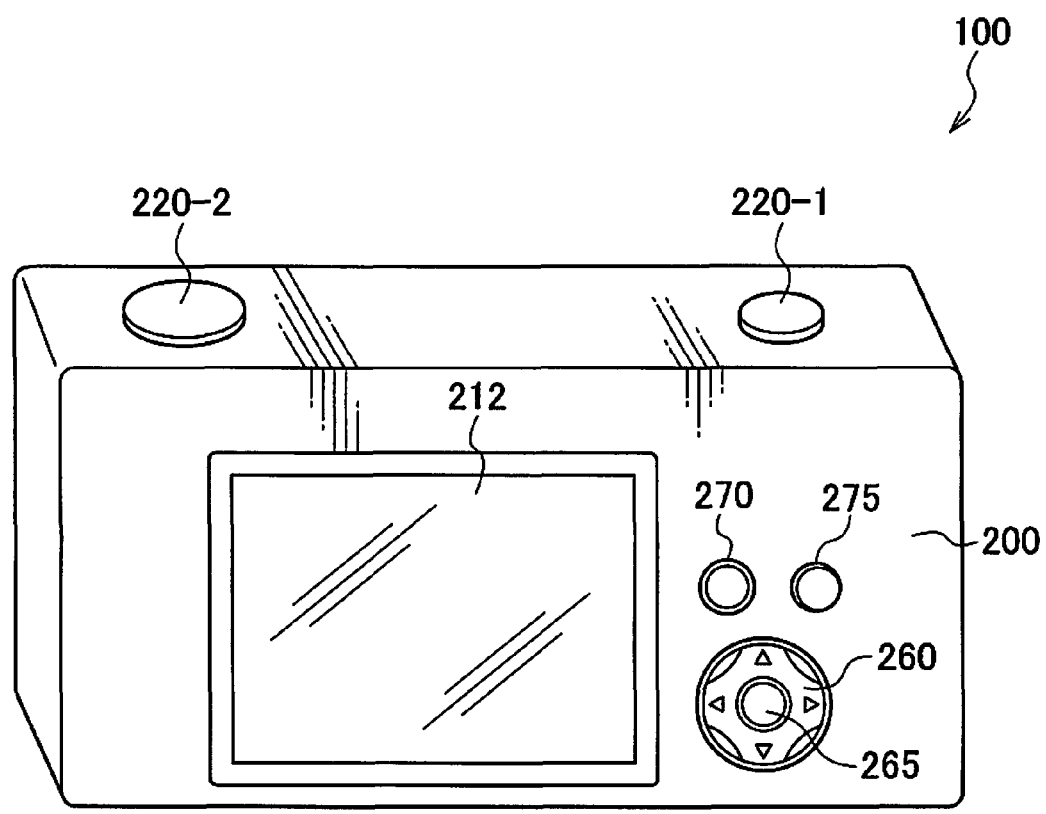
FIG. 2 is a back view of the imaging device illustrated in FIG. 1.

Meanwhile, as illustrated in FIG. 2, a monitor 212, a cross button 260, a MENU/OK button 265, a reproduction button 270 and a BACK button 275, and so on, are arranged in the back surface of the imaging device body 200. Here, the imaging device 100 according to one mode of the present invention may be either a lens-exchange-type imaging device or a lens-fixed-type imaging device.

Figure 3:
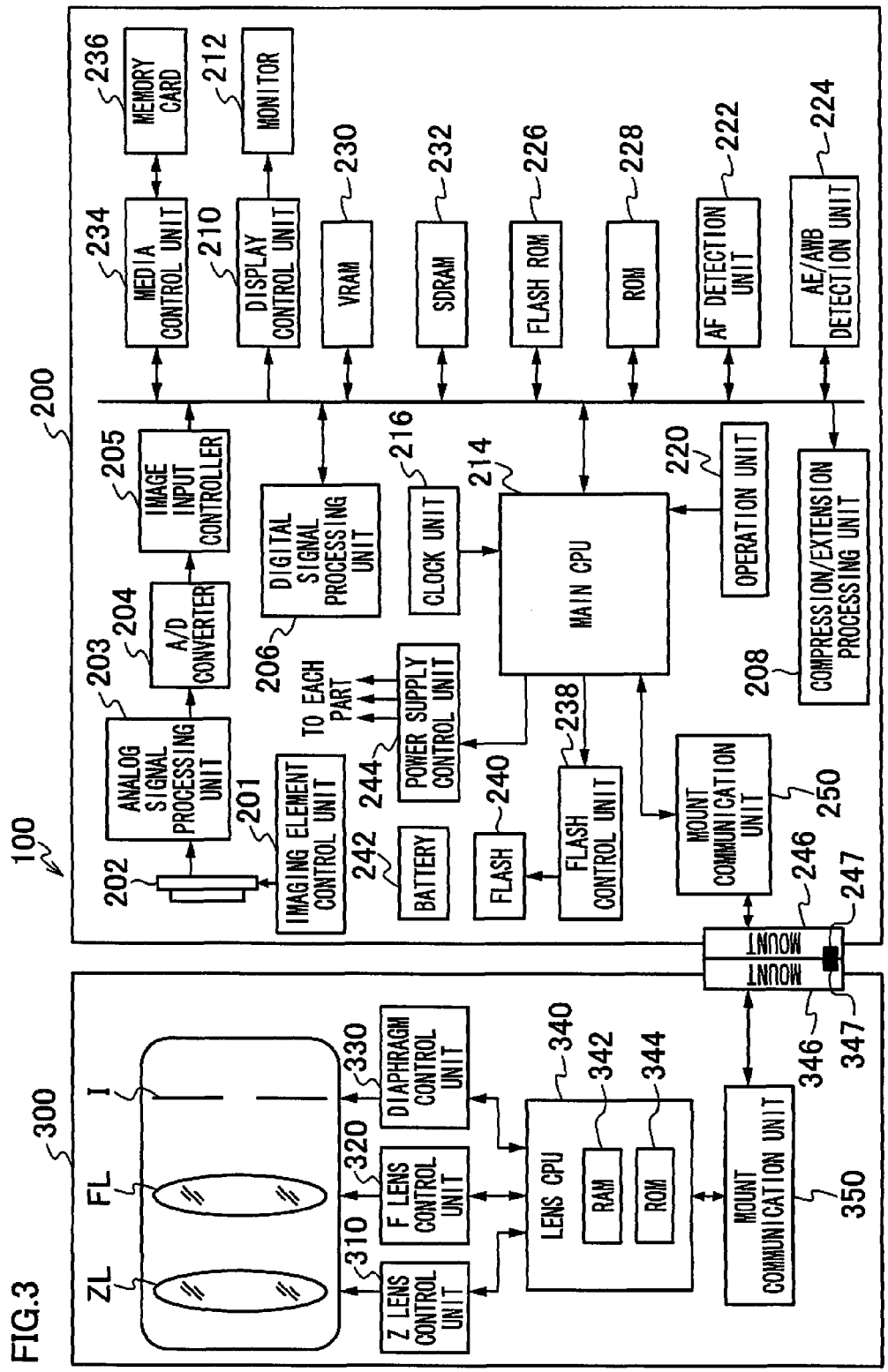
FIG. 3 is a main part block diagram of the imaging device illustrated in FIG. 1.

FIG. 3 is a block diagram illustrating the configuration of the imaging device 100. The operation of the imaging device 100 is integrally controlled by a main CPU 214 of the imaging device body 200 and a lens CPU 340 of the lens apparatus 300. A program (including a program to drive zoom lens ZL focus lens FL and diaphragm I) and data required for the operation of the main CPU 214 are stored in a flash ROM 226 and a ROM 228 in the imaging device body 200, and a program (including a program to drive zoom lens ZL, focus lens FL and diaphragm I) and data required for the operation of the lens CPU 340 are stored in a ROM 344 in the lens CPU 340.

Besides the release button 220-1 and the dial 220-2, an operation unit 220 including a reproduction button, a MENU/OK key, a cross key and a BACK key, and so on, are installed in the imaging device body 200, and, by operating the buttons and keys included in the operation unit 220, the user can give an instruction such as the selection of a photographing/reproduction mode, the start of photographing, the selection/reproduction/deletion of an image and a zoom instruction.

A signal from the operation unit 220 is input in the main CPU 214, and the main CPU 214 controls each circuit of the imaging device body 200 on the basis of the input signal and transmits/receives a signal to/from the lens apparatus 300 through the mount 246 (transmission means, reception means and lens information acquisition unit) and a mount communication unit 250 (transmission means, reception means and lens information acquisition unit).

For example, the above-mentioned terminals include an earth terminal, a synchronization signal terminal, a serial communication terminal, a control status communication terminal and a current supply terminal from a battery 242 of the imaging device body 200 to each part of the lens apparatus 300.

At the time of imaging, subject light is formed on the light receiving surface of an imaging element 202 of the imaging device body 200 through zoom lens ZL, focus lens FL and diaphragm I of the lens apparatus 300. The imaging element 202 is assumed to be a CMOS type in the present embodiment, but it is not limited to the CMOS type and it may be a CCD type. Focus lens FL, zoom lens ZL and diaphragm I are driven by a zoom lens control unit 310, focus lens control unit 320 (lens drive means) and diaphragm control unit 330 that are controlled by the lens CPU 340, and focus control, zoom control and diaphragm control are performed.

The zoom lens control unit 310 moves zoom lens ZL in the optical axis direction and changes the imaging magnification according to an instruction from the lens CPU 340. Moreover, the focus lens control unit 320 performs operation to move focus lens FL backward and forward in the optical axis direction and focus it on the subject according to an instruction from the lens CPU 340. The diaphragm control unit 330 changes the diaphragm value of diaphragm I according to an instruction from the lens CPU 340.

When the release button 220-1 is pressed in the first stage (half press), the main CPU 214 starts AF and AE operation, and, according to this, image data output from an A/D converter 204 is imported in an AE/AWB detection unit 224. The main CPU 214 calculates the brightness (imaging EV value) of the subject from an integrated value of a G signal input in the AE/AWB detection unit 224, and, based on the result, controls the diaphragm value of diaphragm I, the charge storage time (corresponding to the shutter speed) in the imaging element 202 and the luminescence time of the flash 240, and so on.

An AF detection unit 222 is a part that performs contrast AF processing or phase difference AF processing. In a case where the contrast AF processing is performed, focus lens FL in a lens barrel is controlled such that the AF evaluation value that shows the focusing state and is calculated by integrating the high-frequency component of image data in a focus region becomes maximum. Moreover, in a case where the phase difference AF processing is performed, focus lens FL in the lens apparatus 300 is controlled such that the amount of defocus found from phase difference data calculated using pixels having multiple phase differences in the focus region of the image data becomes 0. Here, the AF detection unit 222 moves as a focus detection unit that detects focus.

When the AE operation and the AF operation end and the release button 220-1 is pressed in the second stage (full press), the flash 240 emits light by control through a flash control unit 238. Moreover, a signal charge accumulated in the imaging element 202 is read out as a voltage signal corresponding to the signal charge on the basis of a readout signal added from an imaging element control unit 201, and added to an analog signal processing unit 203. The analog signal processing unit 203 samples and holds R, G and B signals of each pixel by correlation double sampling processing for the voltage signal output from the imaging element 202, amplifies them and then adds them to the A/D converter 204. The A/D converter 204 converts analog R, G and B signals to be sequentially input into digital R, G and B signals and outputs them to an image input controller 205. Here, in a case where the imaging element 202 is a CMOS imaging element, the A/D converter 204 is often built into the imaging element 202, and there is a case where the above-mentioned correlation double sampling is not necessary.

Image data output from the image input controller 205 is input in a digital signal processing unit 206, subjected to signal processing such as offset processing, gain control processing including white balance correction and sensitivity correction, gamma correction processing, restoration processing and YC processing, encoded in a display control unit 210 and output to the monitor 212 after writing/reading to/from a VRAM 230, and thereby a subject image is displayed on the monitor 212.

Moreover, a recording unit that is means for recording the above-mentioned acquired subject image may be included. For example, an image acquired by restoration processing may be recorded in a memory card 236.

Moreover, image data output from the A/D converter 204 in response to the full press of the release button 220-1 is input from the image input controller 205 into an SDRAM (memory) 232 and temporarily stored. After it is temporarily stored in the SDRAM 232, an image file is generated through signal processing such as gain control processing, gamma correction processing and YC processing in the digital signal processing unit 206 and compression processing into the JPEG (Joint Photographic coding Experts Group) format or the like in a compression/extension processing unit 208, and the image file is read out by a media control unit 234 and recorded in the memory card 236. The image recorded in the memory card 236 can be reproduced and displayed on the monitor 212 by operating the reproduction button of the operation unit 220.

Next, communication between the imaging device body 200 and the lens apparatus 300 is described. The imaging device body 200 and the lens apparatus 300 perform communication through the mount 246 (transmission means and reception means) and the mount communication unit 250 (transmission means and reception means) of the imaging device body 200, the mount 346 (transmission means and reception means) and a mount communication unit 350 (transmission means and reception means) of the lens apparatus and terminals installed in the mount 246 and the mount 346, and a lens movement instruction is transmitted and received.

The lens movement instruction includes a control target (zoom lens ZL/focus lens FL/diaphragm I), a drive mode, a numerical value (the target position of zoom lens ZL/focus lens FL, and the diaphragm value of diaphragm I, and so on), and brake ON/OFF information (information showing whether to short the coil of a motor 326 in the target position and apply a brake). Besides the above, communication of various control statuses (lens drive start/completion notice, and so on) is performed between the imaging device body 200 and the lens apparatus 300 through a control status communication terminal.

<Contrast AF>

Next, contrast AF is described with reference to FIGS. 4 and 5.

Figure 4:
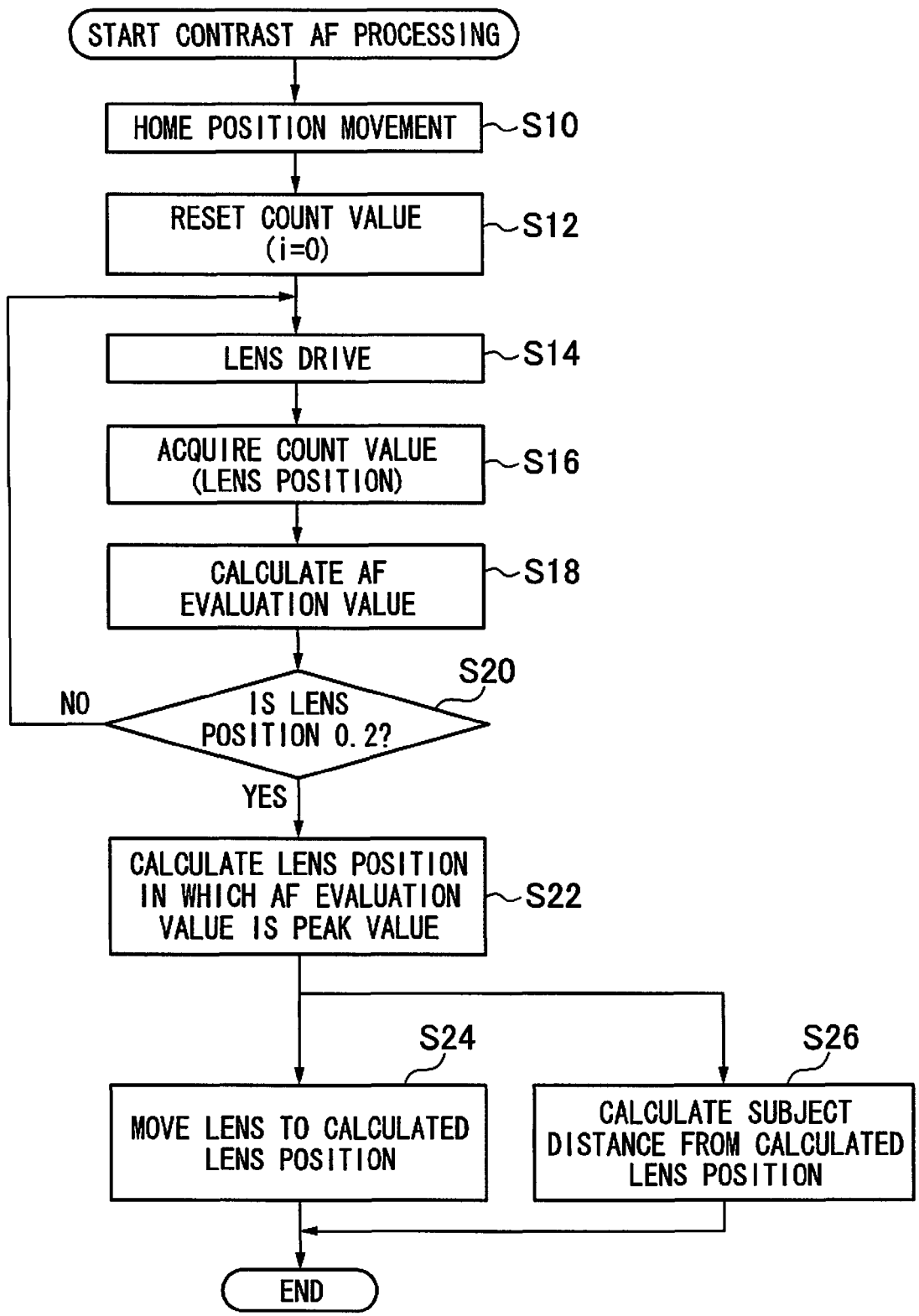
FIG. 4 is a diagram illustrating the flow of contrast auto focus processing.

FIG. 4 illustrates a flow chart of contrast AF processing. When the contrast AF processing starts, first, the main CPU 214 outputs a lens movement instruction that moves focus lens FL to a home position (HP), to the lens apparatus 300 in order to detect the lens position of focus lens FL, and moves focus lens FL to the HP (step S10).

When focus lens FL moves to the HP, the count value of an up-down counter 320-8 (FIG. 6) is reset to make count value i equal to 0 (step S12). Here, an HP sensor 322 (FIG. 6) such as a photo interrupter is set in the HP, and, when focus lens FL being moved based on the lens movement instruction reaches the HP, the HP sensor 322 outputs a lens detection signal. This lens detection signal is used as a reset signal that resets the count value of the up-down counter 320-8 that functions as lens position detection means to 0. Moreover, focus lens FL may be moved to the HP when the lens apparatus 300 is attached to the imaging device body 200 or when a power supply is turned on.

Figure 5:
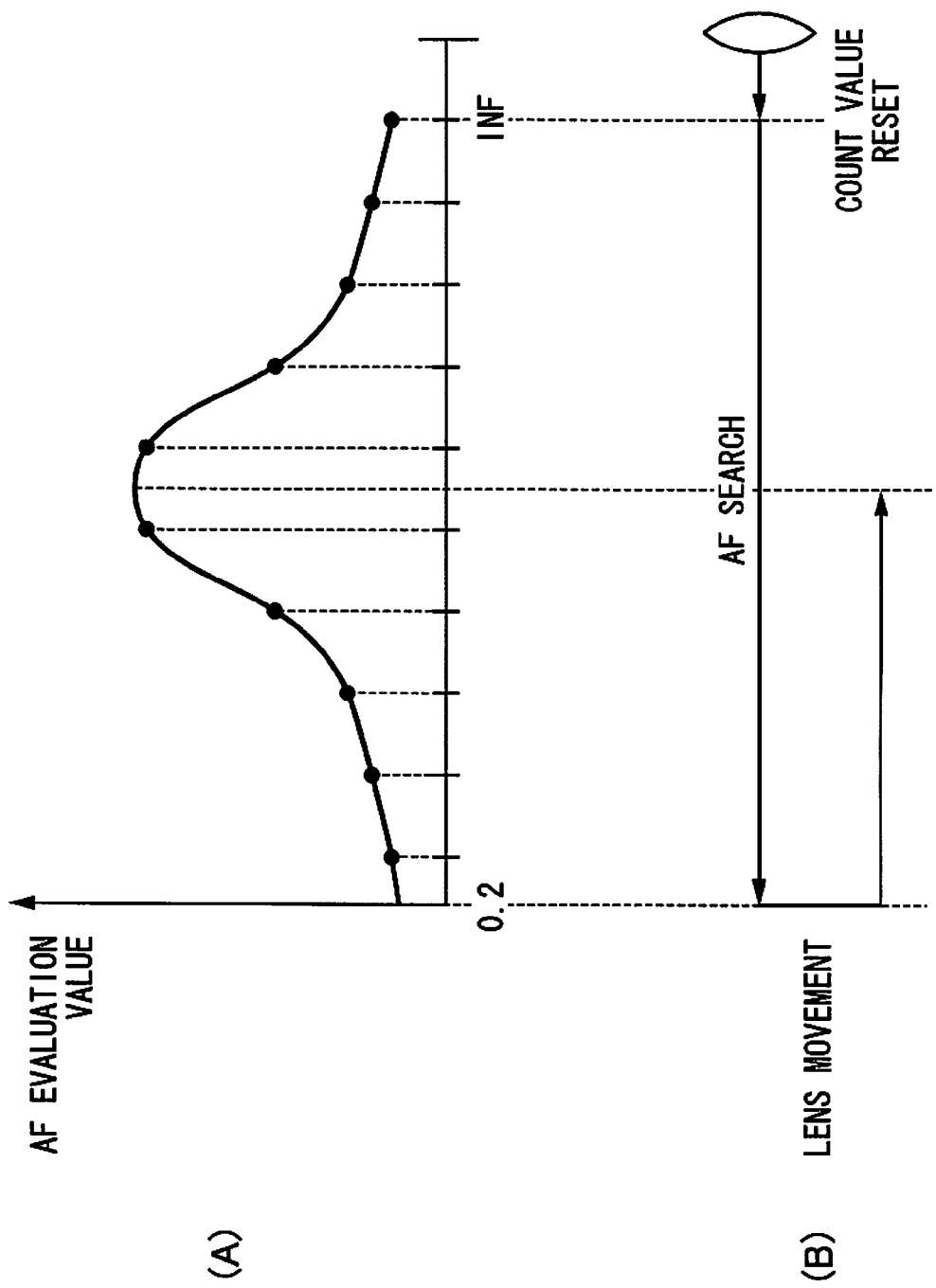
FIG. 5 is a diagram illustrating contrast auto focus.

Subsequently, the main CPU 214 outputs a lens movement instruction that moves focus lens FL from the infinity side (INF) to the close end (AF search) as illustrated in FIG. 5, to the lens apparatus 300 (step S14).

During the AF search, the main CPU 214 acquires the count value from the up-down counter 320-8 of the lens apparatus 300 as a lens position signal (step S16), acquires image data in a focus region for each proper lens position and calculates the AF evaluation value in the AF detection unit 222 (FIG. 3) (step S18). Here, the AF detection unit 222 calculates the AF evaluation value indicating the focusing state by integrating the high-frequency component of the image data in the focus region, and outputs the calculated AF evaluation value to the main CPU 214.

The main CPU 214 decides whether the AF search ends (whether count value i (focus lens FL position) is the close end (0.20)) (step S20), and, in a case where count value i is not the close end, it shifts to step S14 to continue the AF search.

Meanwhile, when determining that the AF search ends, the main CPU 214 calculates the lens position (focusing position) in which the AF evaluation value becomes maximum, on the basis of each AF evaluation value and the lens position which are acquired in steps S16 and S18 (step S22 and (A) part of FIG. 5).

The main CPU 214 outputs a lens position instruction that moves focus lens FL to the calculated focusing position, to the lens apparatus 300, and moves focus lens FL to the focusing position (step S24 and (B) part of FIG. 5).

Moreover, the main CPU 214 calculates a subject distance from the lens position calculated in step S22 (step S26).

<Focus Lens Control Unit>

Figure 6:
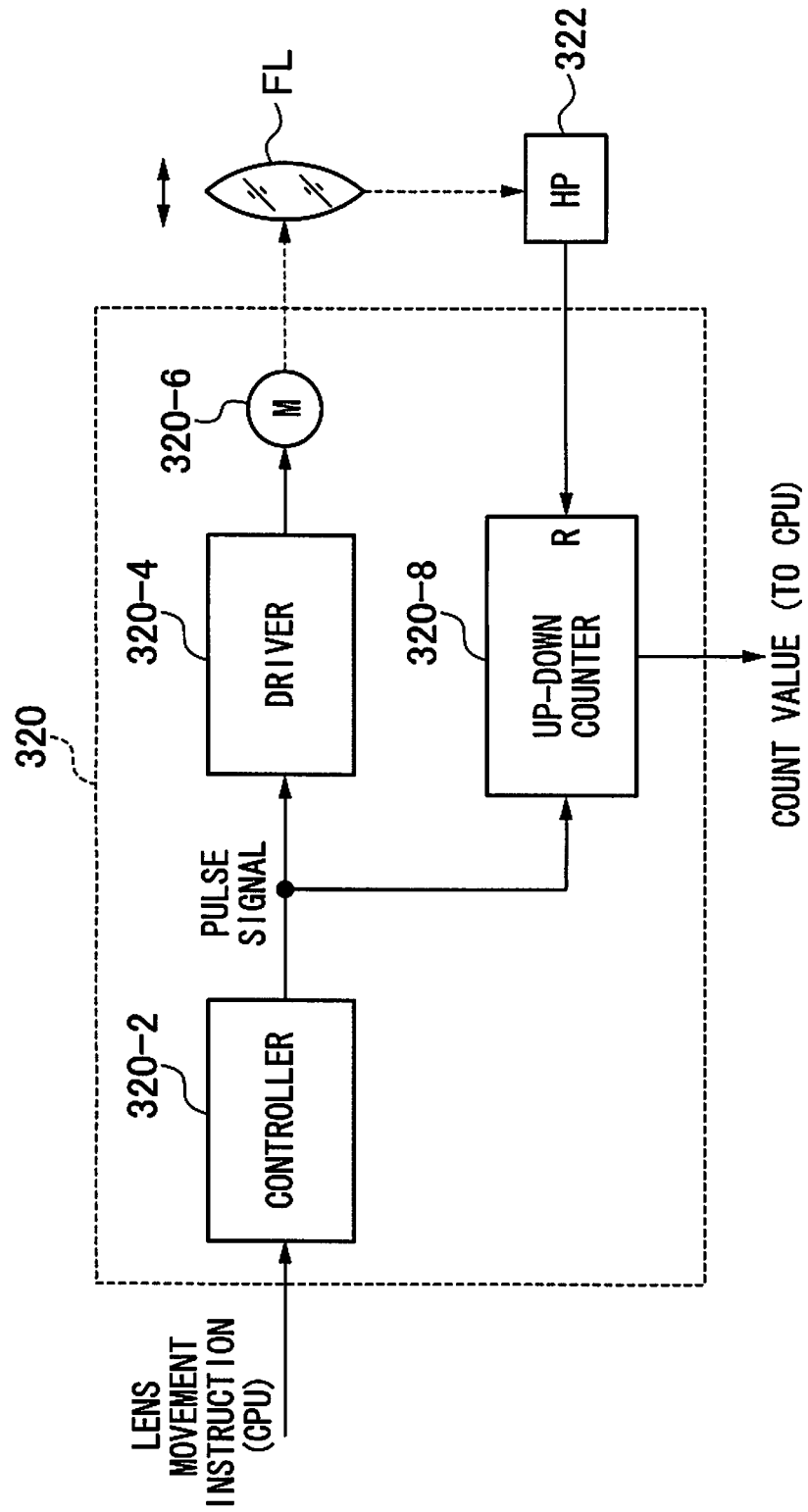
FIG. 6 is a main part block diagram of a focus lens control unit.

FIG. 6 illustrates a functional block diagram of the focus lens control unit 320. A lens movement instruction is sent from the main CPU 214 to the focus lens control unit 320 through the lens CPU 340.

The focus lens control unit 320 mainly includes a controller 320-2, a driver 320-4, a motor 320-6 and the up-down counter 320-8. The lens movement instruction from the lens CPU 340 is received by the controller 320-2. Further, a pulse signal corresponding to the lens movement instruction is output from the controller 320-2. The pulse signal output from the controller 320-2 is input in the driver 320-4. Further, the driver 320-4 drives the motor 320-6 according to the input pulse signal. Here, it is preferable that a stepping motor is used as the motor 320-6. Meanwhile, the pulse signal output from the controller 320-2 is also sent to the up-down counter 320-8.

The up-down counter 320-8 counts the sent pulse signal and outputs the count value. Here, since the up-down counter 320-8 is reset to 0 when focus lens FL reaches the HP by the HP sensor 322 as mentioned above, the count value of the up-down counter 320-8 shows the lens position of focus lens FL based on the HP.

<Point Restoration Processing>

Figure 7:
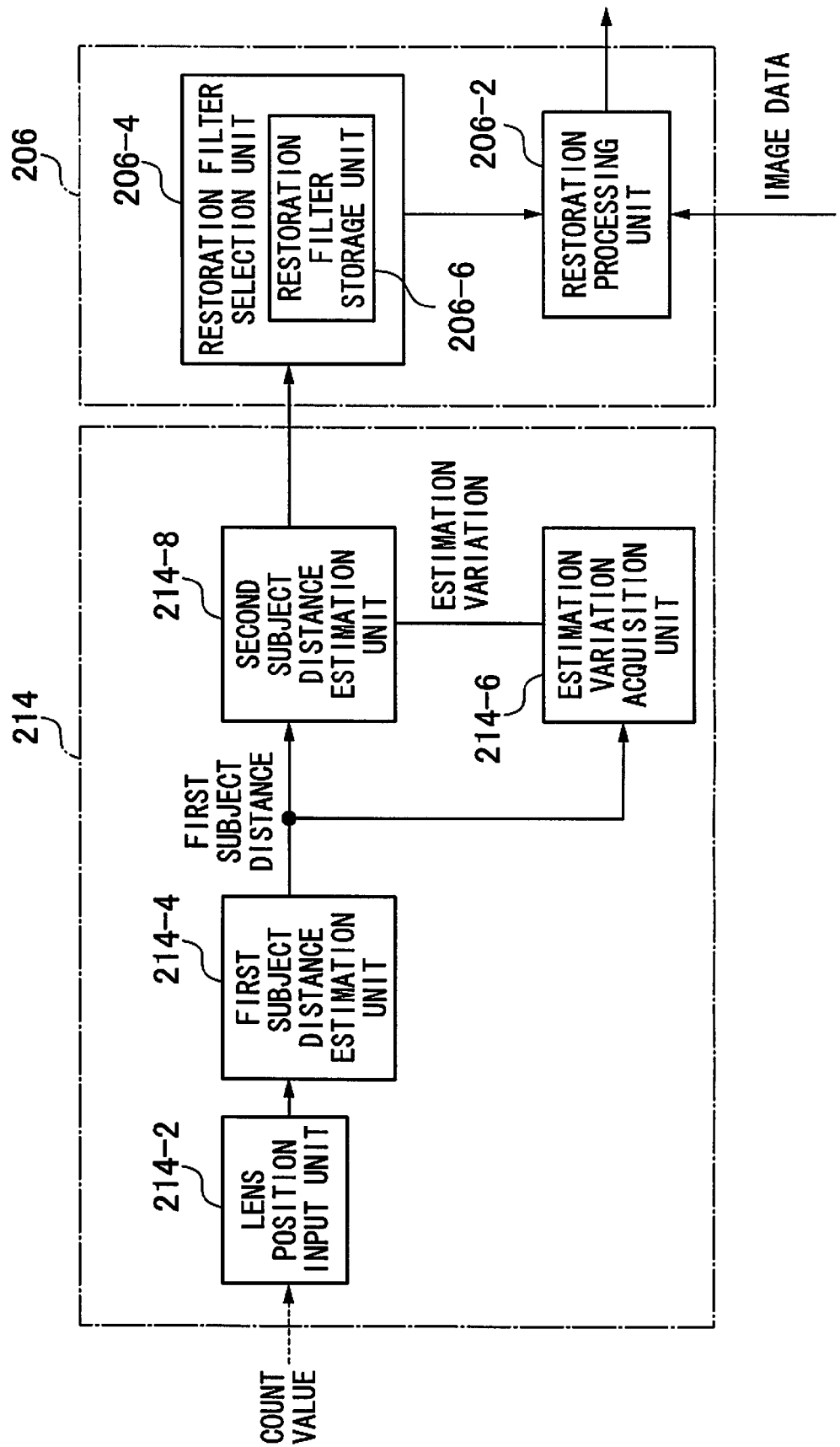
FIG. 7 is a main part block diagram of a main CPU and digital signal processing unit that perform point restoration processing.

FIG. 7 illustrates a main part block diagram of the main CPU 214 and the digital signal processing unit 206 that perform point restoration processing. The main CPU 214 includes a lens position input unit 214-2, a first subject distance estimation unit 214-4, an estimation variation acquisition unit 214-6 and a second subject distance estimation unit 214-8 as a function for restoration processing.

The lens position input unit 214-2 inputs the current count value of the up-down counter 320-8 after focusing control of focus lens FL, as information showing the lens position.

The first subject distance estimation unit 214-4 inputs the information showing the lens position from the lens position input unit 214-2, and estimates the distance of the subject (subject distance) focused by focus lens FL of the current lens position. Here, since the lens position of focus lens FL and the subject distance focused by the lens position have a certain relationship, it is possible to estimate the subject distance from the lens position of focus lens FL.

Information showing the subject distance (first subject distance) estimated by the first subject distance estimation unit 214-4 is output to the estimation variation acquisition unit 214-6 and the second subject distance estimation unit 214-8.

The estimation variation acquisition unit 214-6 calculates the error of the first subject distance (estimation variation) on the basis of the information showing the first subject distance which is input from the first subject distance estimation unit 214-4.

Here, the estimation variation is variation of the first subject distance estimated from the lens position of focus lens FL, and it is caused depending on the detection accuracy of the focusing stop position of focus lens FL, and so on. For example, when the lens barrel characteristic changes by temperature, even if the subject distance is constant, the focusing stop position of focus lens FL changes and incorrect measurement is performed (estimation variation occurs).

Moreover, as for the estimation variation, there is an error range (range of estimation variation) that extends to the infinity side and the close end side around the first subject distance. The estimation variation acquisition unit 214-6 calculates the maximum infinity-side estimation variation in the range of estimation variation with respect to the first subject distance.

For example, in a case where the count value of the up-down counter 320-8 from the HP (or INF) is different from the original count value even if the subject distance is constant (in a case where the focusing stop position of focus lens FL is different), the error of this count value is estimation variation. In a case of a lens apparatus in which the error of the count value occurs within the range of ±n pulses, the movement amount of focus lens FL for n pulses corresponds to the maximum infinity-side estimation variation. Here, since the variation of the focusing subject distance per pulse varies depending on the current focusing stop position of focus lens FL (first subject distance), the estimation variation acquisition unit 214-6 calculates the estimation variation of the first subject distance on the basis of the information showing the first subject distance and information on the error of the count value (n pulses).

Here, the error may be calculated on various conditions or selected from an error database stored in an error storage unit (not illustrated) that is means for storing the error. For example, the error is unique to individuals (individual differences) in an interchangeable lens or depends on the temperature characteristic of the interchangeable lens.

For example, in the case of the imaging device 100 of the interchangeable lens type, since the error range changes for each interchangeable lens, an estimation variation storage unit that is means for storing an error (estimation variation) may be included in the estimation variation acquisition unit 214-6 to store the error of each interchangeable lens (estimation variation). In this case, when the lens apparatus 300 is attached, lens information related to the lens apparatus 300 is acquired, and a corresponding estimation variation is acquired from the estimation variation storage unit on the basis of the lens information. Here, the above-mentioned estimation variation storage unit may be installed in the lens apparatus 300.

Information showing the estimation variation calculated by the estimation variation acquisition unit 214-6 is output to the second subject distance estimation unit 214-8. The second subject distance estimation unit 214-8 calculates the second subject distance adding the estimated first subject distance and the maximum error (estimation variation) on the infinity side, and outputs information showing the calculated second subject distance to a restoration filter selection unit 206-4 of the digital signal processing unit 206.

In the digital signal processing unit 206, main parts related to restoration processing are a restoration processing unit 206-2, the restoration filter selection unit 206-4 and a restoration filter storage unit 206-6.

The restoration filter storage unit 206-6 stores multiple restoration filters created on the basis of the point spread function of various lenses including the lens apparatus 300, for each lens. Moreover, multiple restoration filters correspond to a combination of a subject distance, zoom magnification, f-number and image height (restoration region), and are a lot of restoration filters. Here, for ease of explanation, the restoration filter storage unit 206-6 is assumed to discretely store the restoration filters according to the subject distance.

The restoration filter selection unit 206-4 inputs the information showing the second subject distance from the second subject distance estimation unit 214-8 and selects a restoration filter corresponding to the second subject distance from the restoration filter storage unit 206-6 on the basis of this input information. Here, in a case where the restoration filter corresponding to the second subject distance is not stored in the restoration filter storage unit 206-6, a restoration filter on the infinity side closest to the second subject distance is selected. Here, details of a restoration filter selection method are described later.

The restoration processing unit 206-2 performs restoration processing with respect to image data by the use of the restoration filter selected by the restoration filter selection unit 206-4.

Next, the restoration filter generation method is described.

First, a point image (point light source) is taken by the lens apparatus 300 to measure a PSF (Point Spread Function) of the imaging lens of the lens apparatus 300 of the imaging device 100 at the time of adjustment such as the time before the imaging device 100 is shipped, and a blur (the point image is expanded) image is acquired by aberration.

At this time, there are a method of using the imaging element 202 dedicated for measurement and a method of using the imaging element 202 actually incorporated in the imaging device 100. In the former case, it is suitable for the measurement of PSF corresponding to only the lens apparatus 300, and, in the latter case, it is suitable for the measurement of PSF taking into account the influence of the imaging element 202 (color filter, and so on) too.

Subsequently, when the blur image acquired by taking the point image by an imaging unit including the lens apparatus 300 and the imaging element 202 is assumed to be G(X,Y), the original point image is assumed to be F(X,Y) and point spread function (PSF) is assumed to be H(X,Y), they can be expressed by the following equation.

$$G(X,Y)=H(X,Y)*F(X,Y) \quad \text{[Equation 1]}$$

Where * indicates convolution.

H(X,Y) of Equation 1 (that is, point spread function (PSF)) is calculated on the basis of blur image G(X,Y) acquired by taking the point image as above.

Next, the inverse function of the above-mentioned calculated point spread function (PSF) is calculated. When this inverse function is assumed to be R(X,Y), by performing convolution processing of image G(X,Y) subjected to phase modulation like the following equation by R(X,Y), a restoration image corresponding to original image F(X,Y) is acquired (restoration processing).

$$G(X,Y)*R(X,Y)=F(X,Y) \quad \text{[Equation 2]}$$

This R(X,Y) is called a restoration filter. As the restoration filter, it is possible to use the least square filter (Wiener filter) that minimizes the square mean error between the original image and the restoration image, a limited reverse-convolution filter, a recursive filter and a homomorphism filter, and so on.

[First Embodiment]

Figure 8:
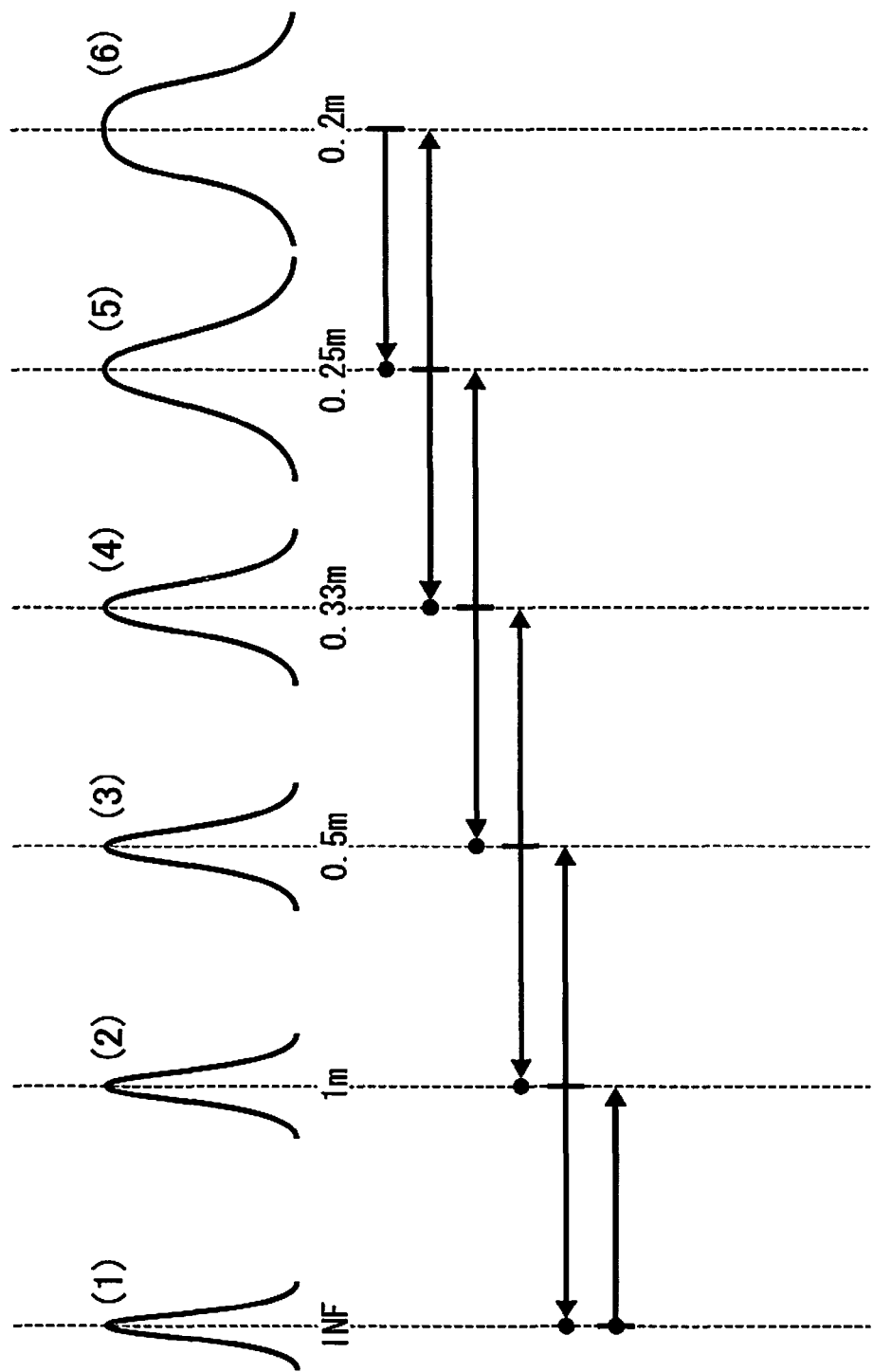
FIG. 8 is a diagram illustrating the way of storing and selecting a restoration filter in the first embodiment of the present invention.
Figure 9:
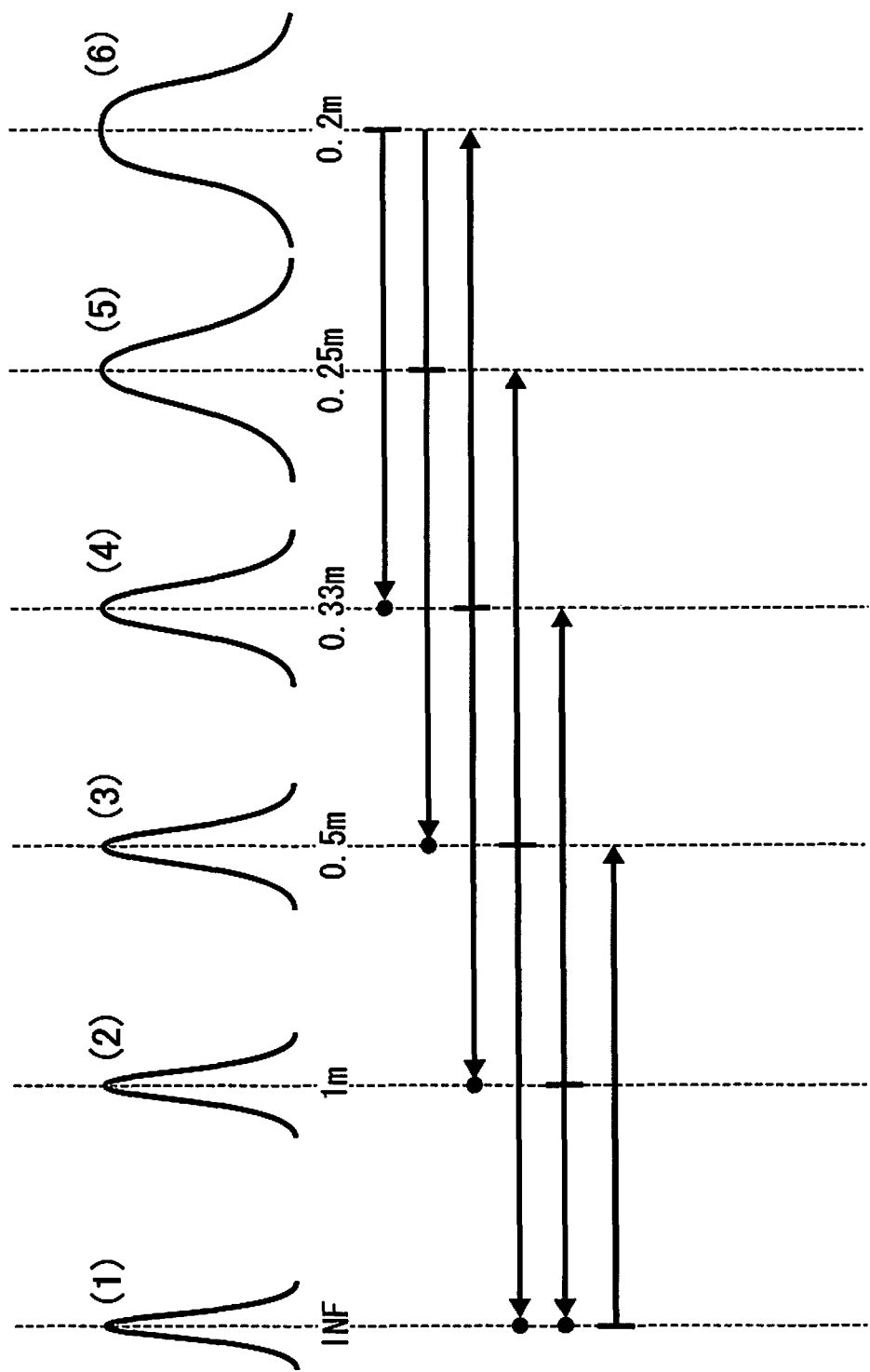
FIG. 9 is a diagram illustrating the way of storing and selecting a restoration filter in the first embodiment of the present invention.
Figure 10:
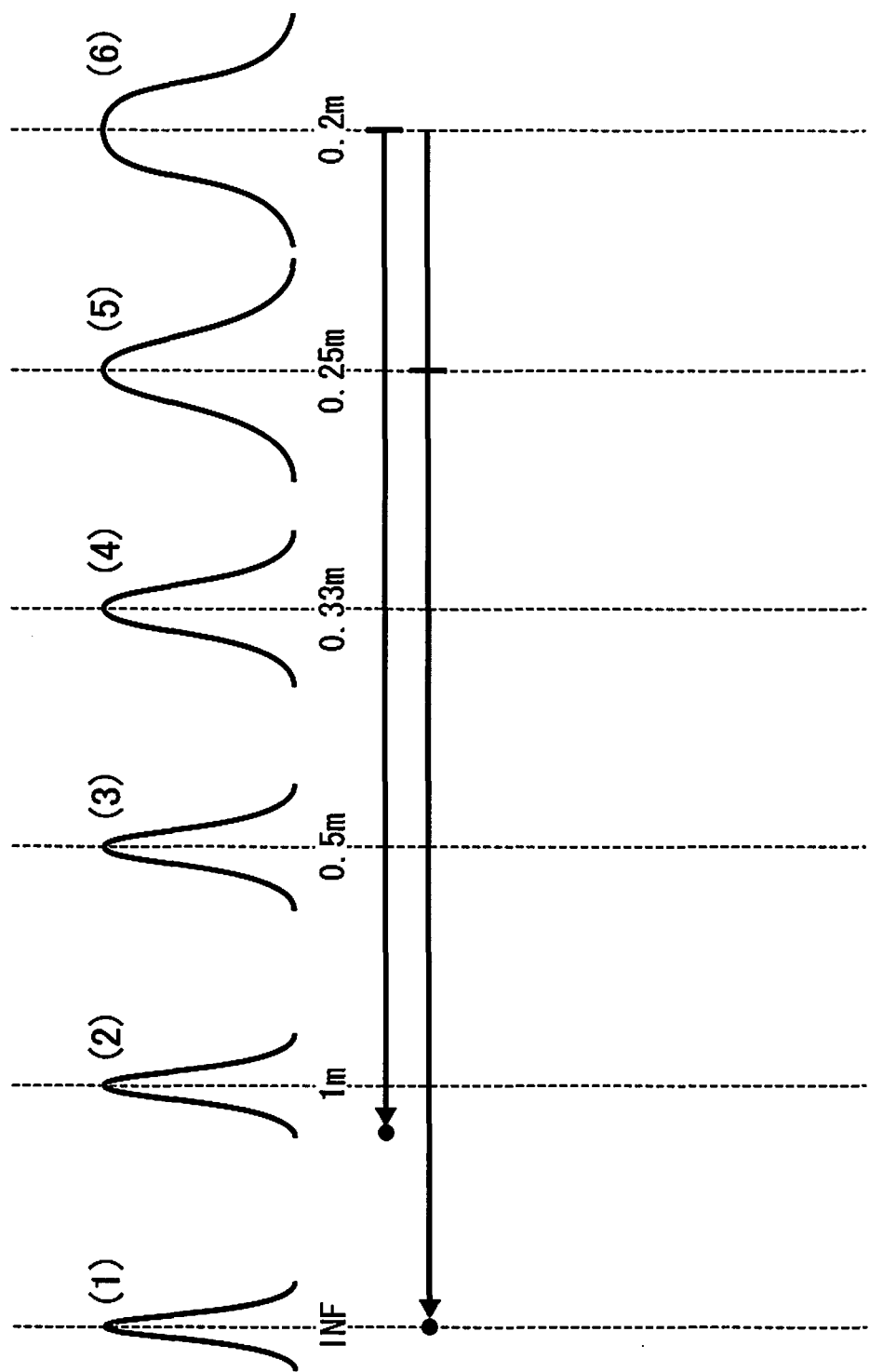
FIG. 10 is a diagram illustrating a way of storing and selecting a restoration filter in the first embodiment of the present invention.

FIGS. 8 to 10 are diagrams to describe a way of storing and selecting a restoration filter in the first embodiment of the present invention, which is performed by the restoration filter selection unit 206-4 and the restoration filter storage unit 206-6.

FIG. 8 is an image view of the point spread function (PSF) for each of multiple subject distances in a range from the close end (0.2 m) to the infinity (INF). As mentioned above, a restoration filter is generated on the basis of these PSFs.

As illustrated in FIG. 8, the PSF on the infinity side has smaller extent than the PSF on the close end side, and therefore restoration processing by a restoration filter on the infinity side is weaker restoration processing than restoration processing by a restoration filter on the close end side.

Moreover, in the example illustrated in FIG. 8, it is assumed that restoration filters corresponding to six distances (subject distances) of the close end (0.2 m), 0.25 m, 0.33 m, 0.5 m, 1 m and INF in a range (range in which imaging is possible) from the close end (0.2 m) to the infinity are stored. Here, these subject distances are subject distances corresponding to respective lens positions dividing the amount of movement from the close end of focus lens FL to INF into almost five equal parts.

The range shown by an arrow in FIG. 8 shows an estimation variation in each subject distance in a case where 0.2 m, 0.25 m, 0.33 m, 0.5 m, 1 m or INF is estimated by the first subject distance estimation unit 214-4.

Moreover, a circle at an arrow point in the figure shows a distance (second subject distance) adding the first subject distance and the maximum infinity-side estimation variation in a range of estimation variation with respect to the first subject distance in a case where the subject distance (first subject distance) estimated by the first subject distance estimation unit 214-4 is 0.2 m, 0.25 m, 0.33 m, 0.5 m, 1 m or INF.

In FIG. 8, in a case where the first subject distance estimated by the first subject distance estimation unit 214-4 is 0.2 m, there is an error range from 0.25 m to 0.2 m, and the second subject distance estimated by the second subject distance estimation unit 214-8 taking into account the maximum infinity-side estimation variation is 0.25 m. Further, a restoration filter on the infinity side closest to the second subject distance is used. That is, a restoration filter generated corresponding to a subject distance of 0.25 m is selected, and overcorrection is prevented. That is, it is assumed that the restoration filter corresponding to the infinity side closest to the second subject distance is selected.

Here, the overcorrection in restoration processing is to estimate a closer subject distance than an actual subject distance and perform restoration processing by the use of a stronger (larger) restoration filter than a restoration filter to be originally used. When the overcorrection in the restoration processing is performed, the quality of an acquired image deteriorates.

As a concrete example in which overcorrection in restoration processing occurs, in a case where the first subject distance estimated by the first subject distance estimation unit 214-4 is 0.25 m and the error range is from 0.33 m to 0.2 m, when a restoration filter generated corresponding to a subject distance of 0.25 m or 0.2 m is selected, there is a possibility of overcorrection in restoration processing. That is, since an actual subject distance is from 0.33 m to 0.2 m, in a case where the actual subject distance is 0.33 m, restoration processing using a restoration filter generated corresponding to a subject distance of 0.25 m or 0.2 m causes overcorrection.

Meanwhile, in a case where a restoration filter generated according to a subject distance that is greatly separated on the infinity side as compared with the second subject distance, the effect of restoration processing cannot be acquired sufficiently. For example, when restoration processing is performed using a restoration filter corresponding to INF though the second subject distance is 0.25 m, the restoration processing is weak, and it is not possible to sufficiently acquire the effect of the restoration processing.

Therefore, in a case where the first subject distance estimated by the first subject distance estimation unit 214-4 is 0.25 m and the second subject distance estimated by the second subject distance estimation unit 214-8 is 0.33 m, it is possible to prevent the occurrence of overcorrection by using a restoration filter generated corresponding to a subject distance of 0.33 m.

In FIG. 8, similar to a case where 0.25 m, 0.33 m, 0.5 m, 1 m or INF is estimated as the first subject distance, an arrow range shows the error range of the subject distance and, within an error range, a restoration filter corresponding to the infinity side closest to the second subject distance is selected. Therefore, a restoration filter generated corresponding to a subject distance of 0.33 m is used in a case where 0.25 m is estimated as the first subject distance, a restoration filter generated corresponding to a subject distance of 0.5 m is used in a case where 0.33 m is estimated, a restoration filter generated corresponding to a subject distance of 1 m is used in a case where 0.5 m is estimated, and a restoration filter generated corresponding to a subject distance of INF is used in a case where INF is estimated.

Moreover, in a case where a subject distance different from 0.2 m, 0.25 m, 0.33 m, 0.5 m, 1 m and INF is estimated as the first subject distance, for example, in a case where a subject distance between 0.33 m and 0.5 m is estimated, the second subject distance taking into account the maximum estimation variation is a subject distance between 0.5 m and 1 m. Therefore, a restoration filter on the infinity side closest to this second subject distance is a restoration filter generated corresponding to a subject distance of 1 m.

Moreover, in the imaging device 100, in photographing in a case where it is decided in advance that a distance place is photographed (scenery mode), a restoration filter generated corresponding to a subject distance of INF may be used regardless of the second subject distance.

FIG. 9 illustrates a measurement error or the like corresponding to a lens (interchangeable lens) different from the lens apparatus 300, and, since the temperature characteristic varies depending on the lens type and there are individual differences, estimation variation of the subject distance estimated from the focusing stop position of the focus lens varies.

As compared with the case of FIG. 8, FIG. 9 illustrates a case where estimation variation (error range) shown by an arrow range is large (long). In the case of FIG. 9, a restoration filter on the infinity side closest to the maximum possible subject distance from the second subject distance is used. That is, a restoration filter generated corresponding to a subject distance of 0.33 m is used in a case where 0.2 m is estimated as the first subject distance, a restoration filter generated corresponding to a subject distance of 0.5 m is used in a case where 0.25 m is estimated, a restoration filter generated corresponding to a subject distance of 1 m is used in a case where 0.33 m is estimated, and a restoration filter generated corresponding to a subject distance of INF is used in a case where 1 m or more is estimated.

As compared with the case of FIG. 9, FIG. 10 illustrates a case where an error range is larger (longer). In the case of FIG. 10, even if the close end (0.2 m) is estimated as the first subject distance, a subject distance (second subject distance) taking into account the estimation variation is larger than 1 m. Therefore, a restoration filter that does not cause overcorrection is only a restoration filter generated corresponding to INF. That is, in the case of a lens having the estimation variation illustrated in FIG. 10, only a restoration filter generated corresponding to INF is used regardless of an estimated subject distance.

[Second Embodiment]

Figure 11:
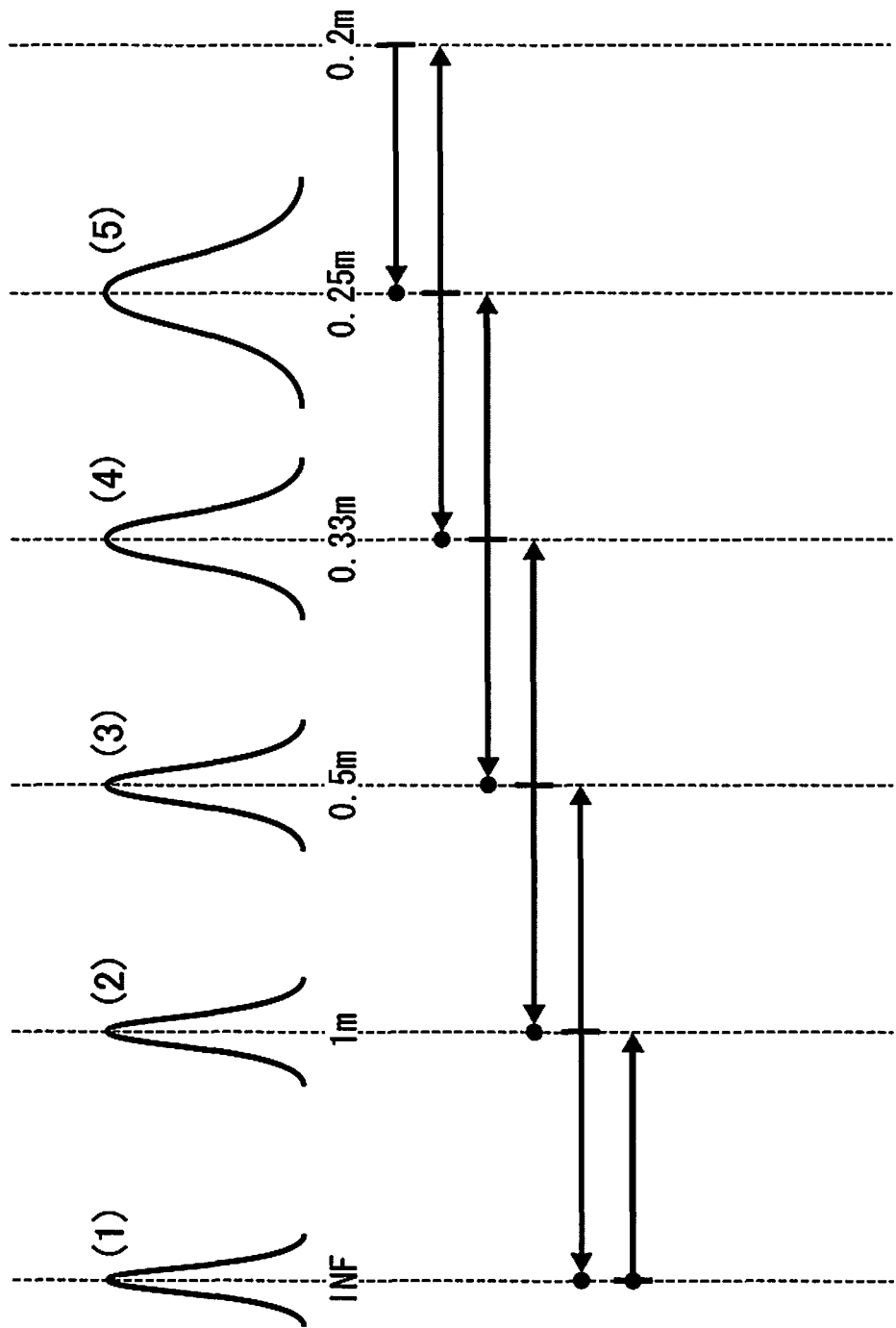
FIG. 11 is a diagram illustrating the way of storing and selecting a restoration filter in the second embodiment of the present invention.
Figure 12:
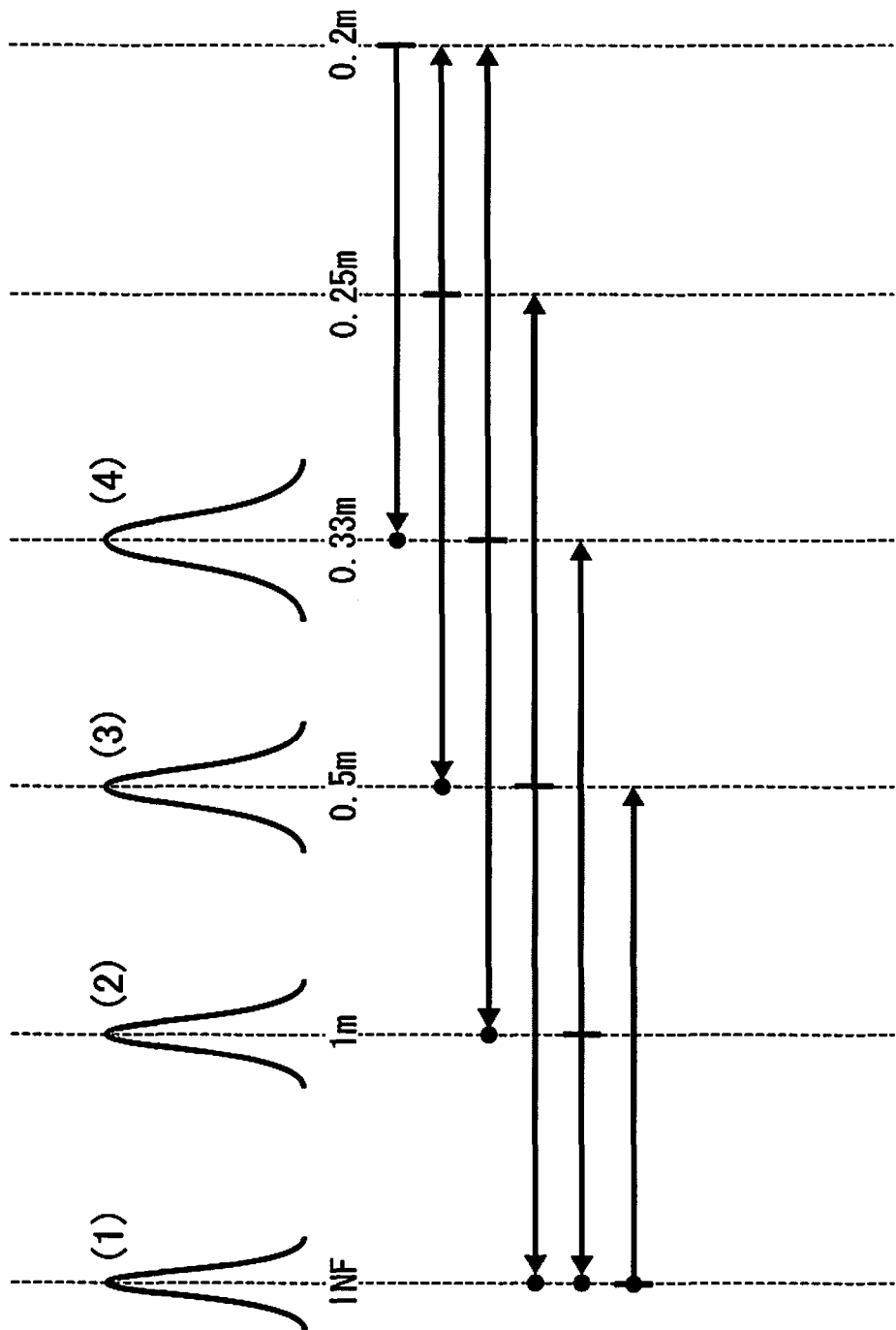
FIG. 12 is a diagram illustrating the way of storing and selecting a restoration filter in the second embodiment of the present invention.
Figure 13:
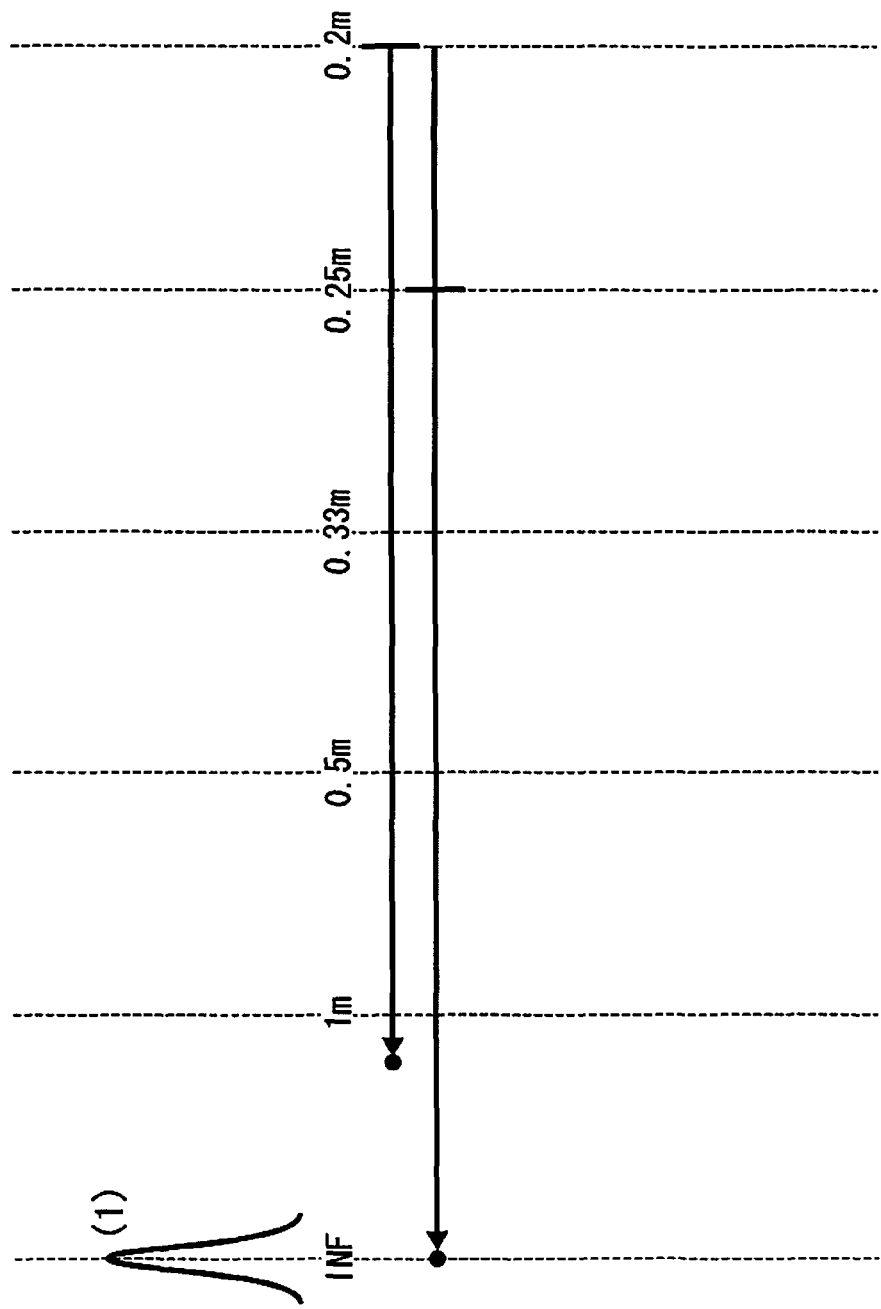
FIG. 13 is a diagram illustrating the way of storing and selecting a restoration filter in the second embodiment of the present invention.

FIGS. 11 to 13 are diagrams to describe a way of storing and selecting a restoration filter in the second embodiment of the present invention.

Similar to the first embodiment illustrated in FIGS. 8 to 10, a restoration filter corresponding to a subject distance is stored in the second embodiment illustrated in FIGS. 11 to 13, but a way of storing the restoration filter in the restoration filter storage unit 206-6 is different in the second embodiment.

In the second embodiment, the restoration filter storage unit 206-6 that is means for storing a restoration filter stores a corresponding restoration filter within a range between the infinity and a subject distance (hereafter referred to as "estimation variation close range") adding only the maximum infinity-side estimation variation in a range of estimation variation with respect to a nearest-side subject distance to the nearest-side subject distance estimated by the first subject distance estimation unit 214-4.

There is a possibility that a restoration filter within a range on the nearer side than the estimation variation close range performs restoration processing that causes overcorrection. Therefore, only multiple corresponding restoration filters within a range between the estimation variation close range and the infinity are stored in the restoration filter storage unit 206-6, such that a restoration filter within a range on the closer side than the estimation variation close range is not stored from the beginning. By this means, the number of restoration filters to be stored in the restoration filter storage unit 206-6 is reduced.

That is, while a restoration filter is stored in the restoration filter storage unit 206-6 regardless of whether it is used for each of multiple subject distances set beforehand in the first embodiment, a restoration filter that is not used depending on a relationship with the error range of a subject distance is not stored in the restoration filter storage unit 206-6 in the second embodiment (see FIGS. 11 to 13).

FIG. 11 is a diagram illustrating the second embodiment corresponding to the first embodiment illustrated in FIG. 8. When the second embodiment illustrated in FIG. 11 and the first embodiment illustrated in FIG. 8 are compared, there is a difference in that a restoration filter corresponding to a subject distance of 0.2 m is not provided in the second embodiment.

In the case of estimation variation shown by arrows in FIG. 11, even if the first subject distance is estimated to be the close end (0.2 m), taking into account an error range, the second subject distance (estimation variation close range) is 0.25 m and a restoration filter corresponding to the infinity side closest to the estimation variation close range is a restoration filter generated corresponding to a subject distance of 0.25 m. In other words, in a case where there is provided an error range as illustrated in FIG. 11, a restoration filter generated corresponding to a subject distance of 0.2 m as illustrated in FIG. 8 is not used regardless of how the first subject distance is. Further, the restoration filter that is not used is not stored in the restoration filter storage unit 206-6.

FIG. 12 is a diagram illustrating the second embodiment corresponding to the first embodiment illustrated in FIG. 9. When the second embodiment illustrated in FIG. 12 and the first embodiment illustrated in FIG. 9 are compared, there is a difference in that restoration filters corresponding to subject distances of 0.2 m and 0.25 m are not provided in the second embodiment.

In the case of estimation variation shown by arrows in FIG. 12, even if the first subject distance is estimated to be the close end (0.2 m), taking into account an error range, the second subject distance (estimation variation close range) is 0.33 m and a restoration filter corresponding to the infinity side closest to the estimation variation close range is a restoration filter generated corresponding to a subject distance of 0.33 m. In other words, in a case where there is provided an error range as illustrated in FIG. 12, restoration filters generated corresponding to subject distances of 0.2 m and 0.25 m as illustrated in FIG. 9 are not used regardless of how the first subject distance is. Further, the restoration filters that are not used are not stored in the restoration filter storage unit 206-6.

FIG. 13 is a diagram illustrating the second embodiment corresponding to the first embodiment illustrated in FIG. 10. When the second embodiment illustrated in FIG. 13 and the first embodiment illustrated in FIG. 10 are compared, there is a difference in that restoration filters corresponding to subject distances of 0.2 m, 0.25 m, 0.33 m, 0.5 m and 1 m are not provided in the second embodiment.

In the case of estimation variation shown by arrows in FIG. 13, even if the first subject distance is estimated to be the close end (0.2 m), taking into account an error range, the second subject distance (estimation variation close range) is greater than 1 m and a restoration filter corresponding to the infinity side closest to the estimation variation close range is a restoration filter of INF(1). In other words, in a case where there is provided an error range as illustrated in FIG. 13, restoration filters of (2) to (6) illustrated in FIG. 10 are not used regardless of how the first subject distance is. Further, the restoration filters of (2) to (6) that are not used are not stored in the restoration filter storage unit 206-6, and the restoration filter of (1) selected depending on the relationship of the error range is stored in the restoration filter storage unit 206-6.

Thus, in the second embodiment illustrated in FIGS. 11 to 13, a restoration filter that is not used depending on the relationship with the error range is not stored in the restoration filter storage unit 206-6. By this means, it is possible to reduce the memory capacity to store restoration filters.

Moreover, the restoration filter storage unit that is means for storing a restoration filter has multiple tables in which multiple restoration filters are stored corresponding to an estimation variation, and the restoration filter selection unit that is means for selecting a restoration filter may select a corresponding table from multiple tables according to the magnitude of estimation variation acquired by the estimation variation acquisition unit 214-6 that is means for acquiring the estimation variation and select a restoration filter from the selected table.

Figure 14:
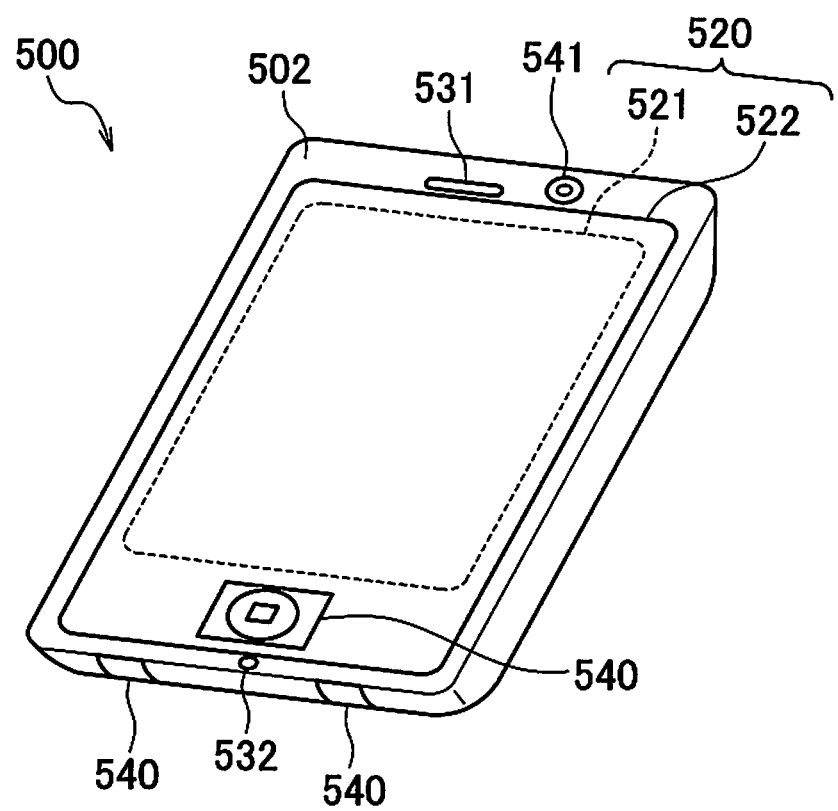
FIG. 14 is an outline drawing of a smartphone that is another embodiment of the imaging device.

FIG. 14 illustrates the appearance of a smartphone 500 that is another embodiment of the imaging device 100. The smartphone 500 illustrated in FIG. 14 has a flat chassis 502 and includes a display input unit 520 in which a display panel 521 as the monitor 212 and an operation panel 522 as an input unit are integrated on one surface of the chassis 502. Moreover, the chassis 502 includes a speaker 531, a microphone 532, an operation unit 540 and a camera unit 541. Here, the configuration of the chassis 502 is not limited to this, and, for example, it is possible to adopt a configuration in which the monitor 212 and the input unit are independent, or a configuration having a folded structure or a sliding mechanism.

Figure 15:
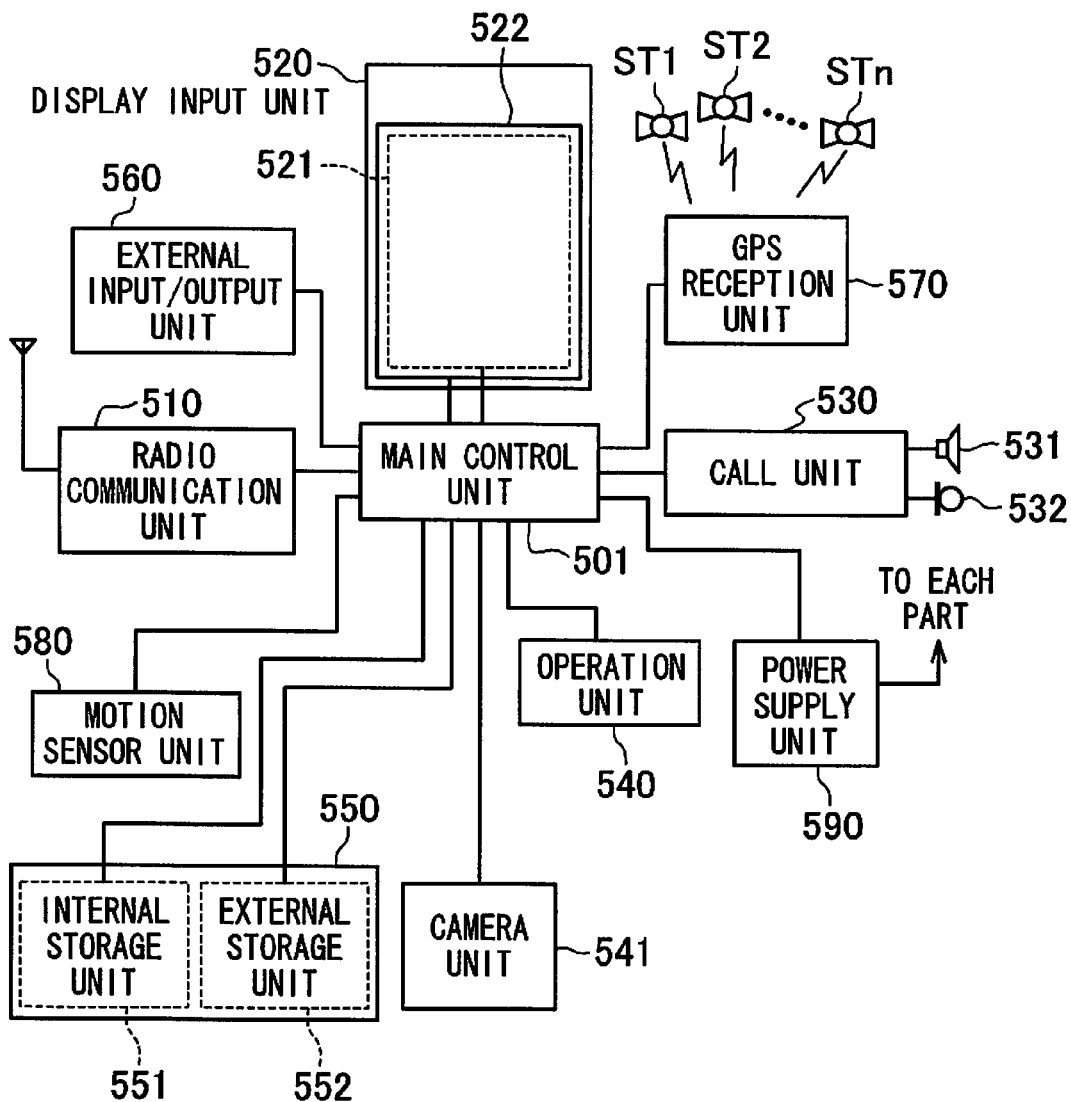
FIG. 15 is a block diagram illustrating a main part configuration of a smartphone.

FIG. 15 is a block diagram illustrating the configuration of the smartphone 500 illustrated in FIG. 14. As illustrated in FIG. 15, a radio communication unit 510, the display input unit 520, a call unit 530, the operation unit 540, the camera unit 541, a storage unit 550, an external input/output unit 560, a GPS (Global Positioning System) reception unit 570, a motion sensor unit 580, a power supply unit 590 and a main control unit 501 are included as main components of the smartphone. Moreover, a radio communication function to perform mobile radio communication through base station apparatus BS and mobile communications network NW is included as a main function of the smartphone 500.

The radio communication unit 510 performs radio communication with base station apparatus BS accommodated in mobile communications network NW according to an instruction of the main control unit 501. By the use of this radio communication, various kinds of file data such as voice data and image data, and email data, and so on, are transmitted and received, and web data and streaming data, and so on, are received.

The display input unit 520 is a so-called touch panel that displays images (still image and moving image) and character information, and so on, visually transmits information to the user and detects user operation with respect to the displayed information by control of the main control unit 501, and includes the display panel 521 and the operation panel 522. In a case where a generated 3D image is appreciated, it is preferable that the display panel 521 is 3D display panel.

As for the display panel 521, an LCD (Liquid Crystal Display) and an OELD (Organic Electro-Luminescence Display), and so on, are used as a display device. The operation panel 522 is a device that is placed so as to be able to visually confirm an image displayed on the display surface of the display panel 521 and that detects one or multiple coordinates operated by user's finger or stylus. When this device is operated by user's finger or stylus, a detection signal generated depending on the operation is output to the main control unit 501. Next, the main control unit 501 detects the operation position (coordinates) on the display panel 521 on the basis of the received detection signal.

As illustrated in FIG. 14, the display panel 521 and the operation panel 522 of the smartphone 500 integrally form the display input unit 520, and they are disposed such that the operation panel 522 completely covers the display panel 521. In a case where this disposition is adopted, the operation panel 522 may have a function to detect user operation even in a region outside the display panel 521. In other words, the operation panel 522 may include a detection region for an overlapping part that overlaps with the display panel 521 (hereafter referred to as "display region"), and a detection region for the remaining outer peripheral part that does not overlap with the display panel 521 (hereafter referred to as "non-display region").

Here, the size of the display region and the size of the display panel 521 may be completely matched, but it does not have to necessarily match both of them. Moreover, the operation panel 522 may include two sensing regions of the outer peripheral part and the remaining inner part. In addition, the width of the outer peripheral part is arbitrarily designed according to the size of the chassis 502, and so on. Furthermore, as a position detection system adopted in the operation panel 522, there are a matrix switch system, a resistance film system, a surface elastic wave system, an infrared ray system, an electromagnetic induction system and an electrostatic capacity system, and so on, and any system can be adopted.

The call unit 530 includes the speaker 531 and the microphone 532, converts user's voice input through the microphone 532 into voice data that can be processed in the main control unit 501, outputs it to the main control unit 501, decodes voice data received by the radio communication unit 510 or the external input/output unit 560 and outputs it from the speaker 531. Moreover, as illustrated in FIG. 14, for example, it is possible to mount the speaker 531 to the same surface as a surface on which the display input unit 520 is installed, and mount the microphone 532 to the side surface of the chassis 502.

The operation unit 540 is a hardware key using a key switch, and so on, and accepts an instruction from the user. For example, as illustrated in FIG. 14, the operation unit 540 is mounted to the lower part or lower side surface of the display unit of the chassis 502 of the smartphone 500, and is a push-button switch that is turned on when being pressed by a finger, and so on, and enters an OFF state by the restoring force of a spring or the like when the finger is separated.

The storage unit 550 stores a control program and control data of the main control unit 501, address data associating the name and telephone number of the communication party, data of transmitted and received email, web data downloaded by web browsing and downloaded content data, or temporarily stores streaming data, and so on. Moreover, the storage unit 550 includes an internal storage unit 551 incorporated in the smartphone and an external storage unit 552 having a detachable external memory slot. Here, each of the internal storage unit 551 and the external storage unit 552 forming the storage unit 550 is realized using storage media such as a memory (for example, a Micro SD (registered trademark) memory, and so on) of a flash memory type, hard disk type, multimedia card micro type or card type, a RAM (Random Access Memory) and a ROM (Read Only Memory).

The external input/output unit 560 plays the role of an interface with all external devices coupled with the smartphone 500, and is directly or indirectly connected with other external devices by communication or the like (for example, a universal serial bus (USB) and IEEE1394, and so on) or a network (for example, the Internet, wireless LAN, Bluetooth (registered trademark), RFID (Radio Frequency Identification), infrared communication (IrDA: Infrared Data Association) (registered trademark), UWB (Ultra Wideband) (registered trademark) and ZigBee (registered trademark), and so on).

As an external device coupled with the smartphone 500, for example, there are a wired/wireless headset, a wired/wireless external charger, a wired/wireless data port, a memory card or SIM (Subscriber Identity Module Card)/UIM (User Identity Module Card) card connected through a card socket, an external audio/video device connected through an audio/video I/O (Input/Output) terminal, an external audio/video device subjected to wireless connection, a smartphone subjected to wired/wireless connection, a personal computer subjected to wired/wireless connection, a PDA subjected to wired/wireless connection, a personal computer subjected to wired/wireless connection and an earphone, and so on. The external input/output unit can transfer data transmitted from such an external device to each component in the smartphone 500 and transmit data in the smartphone 500 to the external device.

The GPS reception unit 570 receives GPS signals transmitted from GPS satellites ST1 to STn according to an instruction of the main control unit 501, performs positioning calculation processing based on the received multiple GPS signals, and detects a position formed with the latitude, longitude and altitude of the smartphone 500. The GPS reception unit 570 can detect the position by the use of position information when the position information can be acquired from the radio communication unit 510 or the external input/output unit 560 (for example, wireless LAN).

For example, the motion sensor unit 580 includes a three-axis acceleration sensor, and so on, and detects the physical movement of the smartphone 500 according to an instruction of the main control unit 501. By detecting the physical movement of the smartphone 500, the movement direction and acceleration of the smartphone 500 are detected. This detection result is output to the main control unit 501.

The power supply unit 590 supplies power accumulated in a battery (not illustrated) to each part of the smartphone 500 according to an instruction of the main control unit 501.

The main control unit 501 includes a microprocessor, performs operation according to a control program and control data stored in the storage unit 550, and integrates and controls each part of the smartphone 500. Moreover, to perform voice communication and data communication through the radio communication unit 510, the main control unit 501 has a mobile communication control function to control each part of a communication system and an application processing function.

The application processing function is realized by making the main control unit 501 perform operation according to application software stored in the storage unit 550. As the application processing function, for example, there are an infrared communication function to control the external input/output unit 560 and perform data communication with an opposite device, an email function to transmit and receive email, a web browsing function to browse web pages, and a function to generate a 3D image from a 2D image according to the present invention, and so on.

Moreover, the main control unit 501 has an image processing function to display an image on the display input unit 520, and so on, on the basis of image data (data of a still image and moving image) such as reception data and downloaded streaming data. The image processing function denotes a function that the main control unit 501 decodes the above-mentioned image data, performs image processing on this decoding result and displays an image on the display input unit 520.

In addition, the main control unit 501 performs display control for the display panel 521 and operation detection control to detect user operation through the operation unit 540 and the operation panel 522.

By performing display control, the main control unit 501 displays an icon to activate application software and a software key such as a scroll bar, or displays a window to create email. Here, the scroll bar denotes a software key to accept an instruction to move an image display part of a large image that cannot be settled in the display region of the display panel 521.

Moreover, by performing operation detection control, the main control unit 501 detects user operation through the operation unit 540, accepts operation with respect to the above-mentioned icon or an input of a character string with respect to an input column of the above-mentioned window through the operation panel 522 or accepts a scroll request of a display image through a scroll bar.

In addition, the main control unit 501 has a touch panel control function to: determine whether an operation position with respect to the operation panel 522 is an overlapping part (display region) that overlaps with the display panel 521 or it is the remaining outer peripheral part (non-display region) that does not overlap with the display panel 521 by performing operation detection control; and control the sensing region of the operation panel 522 and the display position of the software key.

Moreover, the main control unit 501 can detect gesture operation with respect to the operation panel 522 and execute a preset function according to the detected gesture operation. The gesture operation is not simple touch operation in the related art, and means operation to draw a trajectory by finger and so on, designate multiple positions at the same time or combine these to draw a trajectory of at least one of multiple positions.

The camera unit 541 is a digital camera that performs electronic photographing by the use of the imaging element 202 such as a CMOS (Complementary Metal Oxide Semiconductor) and a CCD (Charge-Coupled Device), and has a function similar to the imaging device 100 illustrated in FIG. 1, and so on.

That is, the camera unit 541 is configured so as to be able to switch a manual focus mode and an auto focus mode, and, when the manual focus mode is selected, it is possible to perform focusing of the imaging lens of the camera unit 541 by operating an icon button for focus or the like displayed on the operation unit 540 or the display input unit 520. Further, at the time of the manual focus mode, a live view image combining split images is displayed on the display panel 521, and thereby it is possible to confirm the focusing state at the time of manual focus.

Moreover, by control of the main control unit 501, for example, the camera unit 541 can convert image data acquired by imaging into compressed image data of JPEG (Joint Photographic coding Experts Group) or the like, record it in the storage unit 550 and output it through the external input/output unit 560 or the radio communication unit 510. In the smartphone 500 illustrated in FIG. 14, the camera unit 541 is mounted to the same surface as the display input unit 520, but the mounting position of the camera unit 541 is not limited to this, and it may be mounted to the back surface of the display input unit 520 or multiple cameras 541 may be mounted. Here, in a case where multiple cameras 541 are mounted, it is possible to switch the camera unit 541 provided for photographing and perform photographing alone, or perform photographing by the use of multiple cameras 541 at the same time.

Moreover, the camera unit 541 can be used for various functions of the smartphone 500. For example, it is possible to display an image acquired in the camera unit 541 on the display panel 521 and use an image of the camera unit 541 as one of operation inputs of the operation panel 522. Moreover, when the GPS reception unit 570 detects a position, it is possible to detect the position with reference to an image from the camera unit 541. Furthermore, with reference to the image from the camera unit 541, it is possible to determine the optical axis direction of the camera unit 541 of the smartphone 500 and determine the current use environment, without using a three-axis acceleration sensor or while using the three-axis acceleration sensor together. It is natural that it is possible to use the image from the camera unit 541 in application software.

Besides, position information acquired by the GPS reception unit 570, voice information (which may be text information by performing voice text conversion by the main control unit, and so on) acquired by the microphone 532 and posture information acquired by the motion sensor unit 580, and so on, can be added to image data of a still image or moving image and recorded in the storage unit 550 or output through the external input/output unit 560 or the radio communication unit 510.

Moreover, it is needless to say that the present invention is not limited to the above-mentioned embodiments and various changes are possible without departing from the scope of the present invention.

What is claimed is:

1. An imaging device comprising:
    an imaging unit configured to capture a subject image formed by an imaging lens and acquire an image including the subject image;
    a first subject distance estimation unit configured to calculate an estimated subject distance using signals processed by a focus detection unit that receives the image signal acquired by the imaging unit;
    a restoration filter storage unit configured to store one or more restoration filters selected from multiple restoration filters created based on at least a point spread function of the imaging lens with respect to a subject distance;
    a restoration filter selection unit configured to select a restoration filter corresponding to the subject distance from the restoration filters stored in the restoration filter storage unit, based on the subject distance estimated by the first subject distance estimation unit; and
    a restoration processing unit configured to perform restoration processing of the image acquired by the imaging unit using the restoration filter selected by the restoration filter selection unit,
    wherein the restoration filter storage unit stores a corresponding restoration filter within a range between infinity and a subject distance adding only a maximum infinity-side estimation variation in a range of estimation variation with respect to a nearest-side subject distance to the nearest-side subject distance estimated by the first subject distance estimation unit.

2. The imaging device according to claim 1, wherein the first subject distance estimation unit estimates the subject distance based on a lens position of a focus lens of the imaging lens.

3. The imaging device according to claim 2, wherein:
    the imaging lens is an interchangeable lens; and
    the maximum infinity-side estimation variation in the range of estimation variation with respect to the subject distance estimated by the first subject distance estimation unit is at least one of estimation variation by an individual difference of the interchangeable lens and estimation variation by a temperature characteristic of the interchangeable lens.

4. The imaging device according to claim 1, further comprising:
    an estimation variation acquisition unit configured to acquire the maximum infinity-side estimation variation in a range of estimation variation with respect to the subject distance estimated by the first subject distance estimation unit; and
    a second subject distance estimation unit configured to calculate a subject distance adding the maximum infinity-side estimation variation acquired by the estimation variation acquisition unit to the subject distance estimated by the first subject distance estimation unit,
    wherein the restoration filter selection unit selects an infinity-side restoration filter closest to the subject distance calculated by the second subject distance estimation unit among the one or more restoration filters stored in the restoration filter storage unit.

5. The imaging device according to claim 1, wherein the imaging lens is an interchangeable lens in which the restoration filter storage unit is incorporated.

6. The imaging device according to claim 4, wherein:
    the imaging lens is an interchangeable lens; and
    the estimation variation acquisition unit acquires at least one of estimation variation by an individual difference of the interchangeable lens and estimation variation by a temperature characteristic of the interchangeable lens from the interchangeable lens.

7. The imaging device according to claim 4, wherein:
    the imaging lens is an interchangeable lens; and
    the estimation variation acquisition unit includes a lens information acquisition unit configured to acquire lens information on an interchangeable lens from the interchangeable lens to be attached and an estimation variation storage unit configured to store estimation variation of each of multiple interchangeable lenses, and acquires estimation variation corresponding to the lens information acquired by the lens information acquisition unit from the estimation variation storage unit.

8. The imaging device according to claim 1, further comprising a recording unit configured to record an image acquired by performing restoration processing by the restoration processing unit.

9. An image processing method comprising:
- an image acquisition step of acquiring an image including a subject image from an imaging unit having an imaging lens;
- a first subject distance estimation step of calculating an estimated subject distance using signals processed by a focus detection unit that receives the image signal acquired by the imaging unit;
- a step of preparing a restoration filter storage unit configured to store one or more restoration filters selected from multiple restoration filters created based on at least a point spread function of the imaging lens with respect to a subject distance;
- a restoration filter selection step of selecting a restoration filter corresponding to the subject distance from the restoration filters stored in the restoration filter storage unit, based on the subject distance estimated in the first subject distance estimation step; and
- a restoration processing step of performing restoration processing of the image acquired by the imaging unit using the restoration filter selected in the restoration filter selection step,
- wherein the restoration filter storage unit stores a corresponding restoration filter within a range between infinity and a subject distance adding only a maximum infinity-side estimation variation in a range of estimation variation with respect to a nearest-side subject distance to the nearest-side subject distance estimated in the first subject distance estimation step.

* * * * *